US008822072B2

(12) United States Patent
Yamada et al.

(10) Patent No.: US 8,822,072 B2
(45) Date of Patent: Sep. 2, 2014

(54) NONAQUEOUS ELECTROLYTE AND NONAQUEOUS ELECTROLYTE BATTERY

(75) Inventors: Ichiro Yamada, Fukushima (JP);
Shunsuke Saito, Fukushima (JP);
Haruo Watanabe, Kanagawa (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 13/033,158

(22) Filed: Feb. 23, 2011

(65) Prior Publication Data

US 2011/0274965 A1 Nov. 10, 2011

(30) Foreign Application Priority Data

Mar. 2, 2010 (JP) ................................ P2010-044810
Jun. 17, 2010 (JP) ................................ P2010-138776

(51) Int. Cl.
*H01M 10/26* (2006.01)
*H01M 10/0567* (2010.01)
*H01M 10/0568* (2010.01)
*H01M 10/0569* (2010.01)
*H01M 10/0525* (2010.01)
*H01M 10/0565* (2010.01)

(52) U.S. Cl.
CPC ...... *H01M 10/0567* (2013.01); *H01M 10/0568* (2013.01); *H01M 10/0569* (2013.01); *H01M 2300/0025* (2013.01); *H01M 10/0525* (2013.01); *H01M 10/0565* (2013.01); *Y02E 60/122* (2013.01)
USPC ........... 429/207; 429/323; 429/326; 429/327; 429/218.1; 429/221; 429/231.95

(58) Field of Classification Search
CPC ................... H01M 10/0525; H01M 10/0565; H01M 10/0567; H01M 10/0568; H01M 10/0569; H01M 2300/0025; Y02E 60/122
USPC ......... 429/321–323, 326–327, 330–332, 207, 429/218.1, 221, 223–224, 231.95, 338, 22, 429/3
See application file for complete search history.

(56) References Cited

U.S. PATENT DOCUMENTS

2004/0234853 A1* 11/2004 Adachi et al. .............. 429/231.1
2008/0138704 A1* 6/2008 Mizuta et al. ................ 429/203

FOREIGN PATENT DOCUMENTS

CN 101510599 8/2009
CN 101621139 1/2010
(Continued)

OTHER PUBLICATIONS

Chen et al. [Lithium Salts of Heteropolyacid as the Electrolyte of Lithium-ion Battery, Synthetic Metals 135-136 (2003) 225-226].*

(Continued)

*Primary Examiner* — Patrick Ryan
*Assistant Examiner* — Ben Lewis
(74) *Attorney, Agent, or Firm* — K&L Gates LLP

(57) ABSTRACT

A nonaqueous electrolyte includes: a solvent, an electrolyte salt, and at least one of heteropolyacid salt compounds represented by the following formulae (I) and (II): $H_xA_y[BD_{12}O_{40}] \cdot zH_2O$ (I), $H_pA_q[B_5D_{30}O_{110}] \cdot rH_2O$ (II). A represents Li, Na, K, Rb, Cs, Mg, Ca, Al, $NH_4$, or an ammonium salt or phosphonium salt; B represents P, Si, As or Ge; D represents at least one element selected from Ti, V, Cr, Mn, Fe, Co, Ni, Cu, Zn, Ga, Zr, Nb, Mo, Tc, Rh, Cd, In, Sn, Ta, W, Re and Tl; x, y and z are values falling within the ranges of ($0 \leq x \leq 1$), ($2 \leq y \leq 4$) and ($0 \leq z \leq 5$), respectively; and p, q and r are values falling within the ranges of ($0 \leq p \leq 5$), ($10 \leq q \leq 15$) and ($0 \leq r \leq 15$), respectively.

14 Claims, 7 Drawing Sheets

(56) References Cited

FOREIGN PATENT DOCUMENTS

| | | | | |
|---|---|---|---|---|
| JP | 01-264172 | | 10/1989 | |
| JP | 08-213008 | | 8/1996 | |
| JP | 2002-289188 | | 10/2002 | |
| JP | 2004-214116 | * | 7/2004 | .............. H01M 4/58 |
| JP | 2005-353568 | | 12/2005 | |
| JP | 2006-086058 | | 3/2006 | |
| JP | 2007-131596 | | 5/2007 | |
| JP | 2008-016234 | | 1/2008 | |
| JP | 2008-179622 | | 8/2008 | |
| JP | 2009-107990 | | 5/2009 | |

OTHER PUBLICATIONS

Japanese Office Action issued Oct. 22, 2013 in corresponding Japanese Patent Application No. 2010-138776.

Wang, Xiu, Study on Polyacenic Semiconductor/Lithium Secondary Battery with Silicotingstic Lithium as Electrolyte, J. of Inner Mongolia Univ. for Nationalities, Apr. 2002, vol. 17, No. 2.

Chinese Office Action issued May 6, 2014 in corresponding Chinese Patent Application No. 201110044358.0.

* cited by examiner

NONAQUEOUS ELECTROLYTE AND NONAQUEOUS ELECTROLYTE BATTERY

CROSS REFERENCES TO RELATED APPLICATIONS

The present application claims priority to Japanese Patent Application Nos. JP 2010-044810 filed on Mar. 2, 2010 and JP 2010-138776 filed on Jun. 17, 2010, the entire contents of which are hereby incorporated by reference.

BACKGROUND

The present disclosure relates to a nonaqueous electrolyte and to a nonaqueous electrolyte battery, and more specifically relates to a nonaqueous electrolyte containing an organic solvent and an electrolyte salt and to a nonaqueous electrolyte battery using the same.

In recent years, portable electronic appliances such as a camera-integrated VTR (video tape recorder), a mobile phone and a laptop personal computer have widely spread, and it is strongly demanded to realize downsizing, weight reduction and long life thereof. Following this, the development of batteries as a portable power source for electronic appliances, in particular, secondary batteries which are lightweight and from which a high energy density is obtainable is advanced.

Above all, secondary batteries utilizing intercalation and deintercalation of lithium (Li) for a charge/discharge reaction (so-called lithium ion secondary batteries) are widely put into practical use because a high energy density is obtainable as compared with conventional lead batteries and nickel-cadmium batteries which are a nonaqueous electrolytic solution secondary battery. Such a lithium ion secondary battery is provided with an electrolyte together with a positive electrode and a negative electrode.

In particular, laminated batteries using an aluminum laminated film for a package member have a large energy density because of their light weight. Also, in the laminated batteries, when a nonaqueous electrolytic solution is swollen into a polymer, deformation of the laminated battery can be suppressed, and therefore, a laminated polymer battery is also widely used.

However, in the laminated battery, since the package member is soft, there was involved such a problem that the battery is easy to cause blister by a gas generated in the inside of the battery at the time of initial charge and also at the time of high-temperature storage. In response to this problem, as described in Patent Document 1 (JP-A-2006-86058), by adding a halogenated cyclic carbonate such as fluoroethylene carbonate or a cyclic carbonate having a carbon-carbon multiple bond such as vinylene carbonate to a nonaqueous electrolytic solution, a reaction of a negative electrode active material with the nonaqueous electrolytic solution, or the like is suppressed, whereby the battery blister at the time of initial charge can be suppressed. But, such a reactive cyclic carbonate was unable to suppress the battery blister at the time of use at a high temperature.

Also, Patent Document 2 (JP-A-2002-289188) proposes to use, as an electrode active material, a heteropolyacid salt which is a compound capable of intercalating and deintercalating a lithium ion and takes a relatively stable structure.

SUMMARY

However, Patent Document 1 has not led to obtention of sufficient battery characteristics because of own reactivity of a heteropolyacid which is an oxidation-reduction agent. The reasons why sufficient characteristics are not obtained reside in the matter that the heteropolyacid itself is a strong oxidation-reduction agent and is a strong acid; the matter that the heteropolyacid contains crystal water in a structure thereof; and so on. In consequence, when such a heteropolyacid compound is previously added in an electrode mixture or a nonaqueous electrolytic solution, the heteropolyacid having a very high oxidation-reduction power and a free acid derived from crystal water, for example, hydrofuran, etc. corrode a collector or a binder, thereby causing to deteriorate the battery characteristics such as a cause of electrical resistance.

Also, Patent Document 2 is concerned with the use of a heteropolyacid for the active material itself, but it is not concerned with an enhancement of safety by using a heteropolyacid.

Thus, it is desirable to provide a nonaqueous electrolyte and a nonaqueous electrolyte battery, each of which is able to suppress a gas generated in the inside of a battery at the time of initial charge and also at the time of high-temperature storage and hardly causes the battery blister.

According to one embodiment there is provided a nonaqueous electrolyte including a solvent, an electrolyte salt and at least one of heteropolyacid salt compounds represented by the following formulae (I) and (II).

According to another embodiment there is provided a nonaqueous electrolyte battery including a positive electrode, a negative electrode and a nonaqueous electrolyte, wherein a coating in a gel form containing an amorphous polyacid and/or polyacid compound containing one or more of a polyelement, which is derived from at least one of heteropolyacid salt compounds represented by the following formulae (I) and (II), is provided on the surface of at least a part of the negative electrode.

$$H_xA_y[BD_{12}O_{40}] \cdot zH_2O \qquad (I)$$

In the formula (I), A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and x, y and z are values falling within the ranges of ($0 \leq x \leq 1$), ($2 \leq y \leq 4$) and ($0 \leq z \leq 5$), respectively.

$$H_pA_q[B_5D_{30}O_{110}] \cdot rH_2O \qquad (II)$$

In the formula (II), A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and p, q and r are values falling within the ranges of ($0 \leq p \leq 5$), ($10 \leq q \leq 15$) and ($0 \leq r \leq 15$), respectively.

According to the embodiments in view of the fact that the nonaqueous electrolytic solution contains at least one of the heteropolyacid salt compounds represents by the formulae (I) and (II), the moisture and acid component in the nonaqueous electrolyte can be lowered. Then, in the nonaqueous electrolyte battery using this nonaqueous electrolyte, not only a coating can be formed on the negative electrode, but a side reaction to be caused due to the moisture and acid component in the electrolyte can be suppressed.

According to the embodiments decomposition of the electrolyte is suppressed, whereby the gas generation can be suppressed. Also, deterioration of each of parts of the battery can be suppressed.

Additional features and advantages are described herein, and will be apparent from the following Detailed Description and the figures.

DETAILED DESCRIPTION

Figure 1:
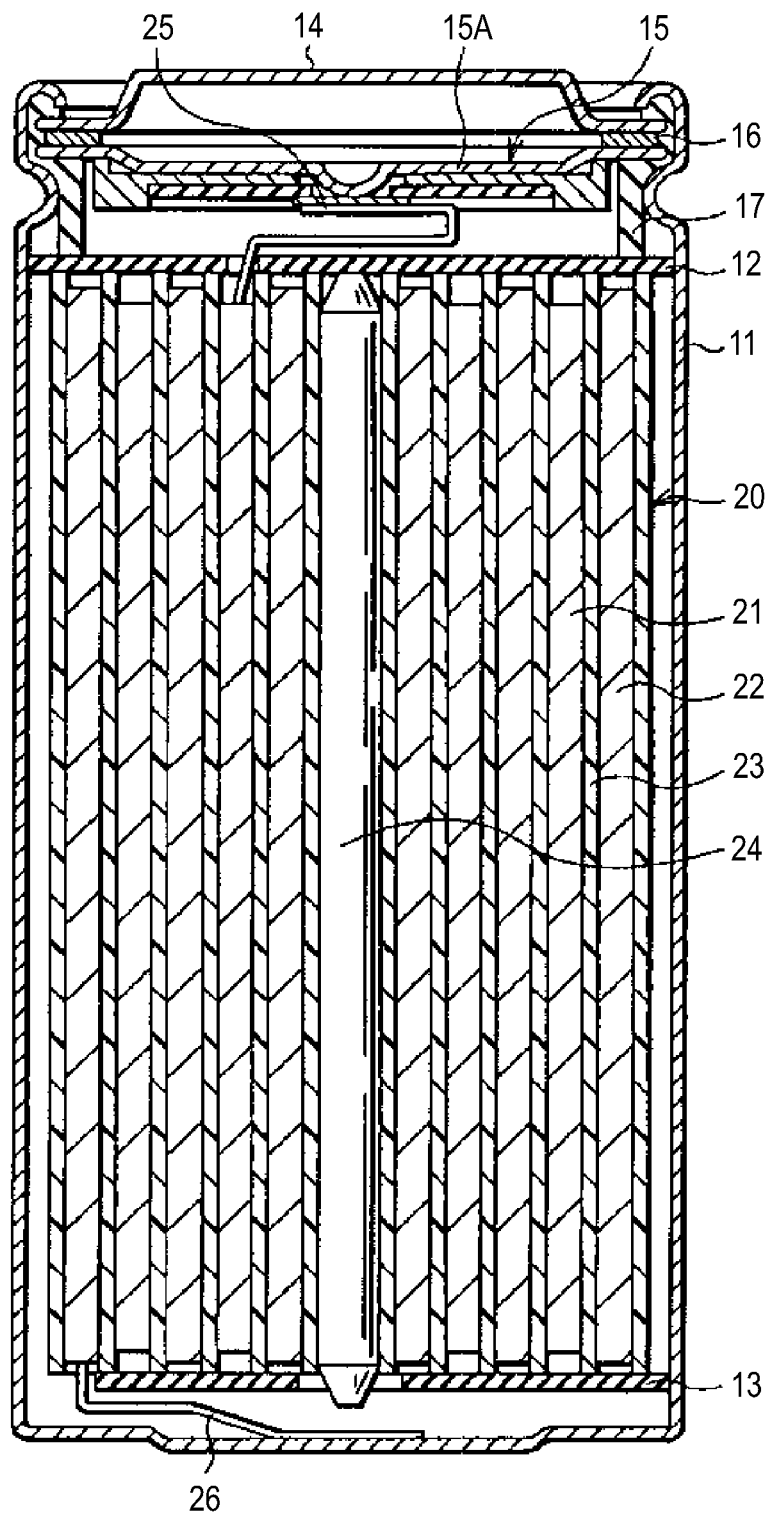
FIG. 1 is a sectional view showing a configuration example of a nonaqueous electrolyte battery according to an embodiment.

Embodiments are hereunder described by reference to the accompanying drawings. The description is made in the following order.

1. First embodiment (an example of a nonaqueous electrolytic solution containing a heteropolyacid salt compound according)

2. Second embodiment (an example using a cylindrical type nonaqueous electrolyte battery)

3. Third embodiment (an example using a laminated film type nonaqueous electrolyte battery)

4. Fourth embodiment (an example using a laminated film type nonaqueous electrolyte battery)

5. Fifth embodiment (an example using a rectangular type nonaqueous electrolyte battery)

6. Sixth embodiment (an example of a nonaqueous electrolyte battery using a laminate type electrode body)

7. Other embodiments

1. First Embodiment

A nonaqueous electrolytic solution according to a first embodiment is described. The nonaqueous electrolytic solution according to the first embodiment is, for example, used for electrochemical devices such as batteries. The nonaqueous electrolytic solution contains a solvent, an electrolyte salt and a heteropolyacid salt compound. The electrolyte salt and the heteropolyacid salt compound are soluble in the solvent.

(1-1) Heteropolyacid Salt Compound

The heteropolyacid salt compound according to the first embodiment is represented by at least one of the following formula (I) having a Keggin structure and the following formula (II) having a Preyssler structure.

$$H_xA_y[BD_{12}O_{40}] \cdot zH_2O \quad (I)$$

In the formula (I), A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and x, y and z are values falling within the ranges of ($0 \leq x \leq 1$), ($2 \leq y \leq 4$) and ($0 \leq z \leq 5$), respectively.

$$H_pA_q[B_5D_{30}O_{110}] \cdot rH_2O \quad (II)$$

In the formula (II), A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and p, q and r are values falling within the ranges of ($0 \leq p \leq 5$), ($10 \leq q \leq 15$) and ($0 \leq r \leq 15$), respectively.

That is, in the formulae (I) and (II), in the heteropolyacid salt compound, the acid component ($H_x$ in the formula (I) or $H_p$ in the formula (II)) proton is not more than a half of the salt ($A_y$ in the formula (I) or $A_q$ in the formula (II)) in the heteropolyacid salt compound.

When the heteropolyacid salt compound represented by the formula (I) and/or the formula (II) is contained in the nonaqueous electrolytic solution, a coating which is called a stable SEI (solid electrolyte interface coating) is formed on an electrode surface, particularly a negative electrode surface by charge/discharge at the initial stage of use. Since the coating derived from the heteropolyacid salt compound capable of intercalating and deintercalating Li has excellent Li ion permeability, it may be considered that the gas generation at the time of high-temperature use is reduced without deteriorating a cycle characteristic while suppressing a reaction between the electrode and the nonaqueous electrolytic solution. Also, in particular, when the heteropolyacid salt compound represented by the formula (II) having a Preyssler structure is used, it is more easily soluble in the solvent of the battery and can exist stably over a wide pH range.

When the acid component exists in the nonaqueous electrolytic solution, its oxidation-reduction power is strong, so that there is involved such a problem that undesirable side reactions such as decomposition of the nonaqueous electrolytic solution and corrosion are caused. Also, when the moisture exists in the nonaqueous electrolytic solution, there are involved such problems that a free acid derived from crystal water, for example, hydrofuran, etc. corrodes a collector or a binder and that decomposition of the electrolyte salt is caused.

Meanwhile, since the heteropolyacid salt compound according to the first embodiment has a structure in which a part or all of protons are substituted with an alkali metal cation, it does not produce a free acid. Also, by using the heteropolyacid salt compound having an anion with a large valence, even when it is in a state free from crystal water, similar to the heteropolyacid, the heteropolyacid salt compound is easily soluble in the nonaqueous electrolytic solution and becomes possible to take a stable structure. In the inside of the battery, the heteropolyacid salt compound having a highest valence in a stable structure over a wider pH range is easily reduced, thereby forming a coating electrochemically easily.

It is preferable that a content of the moisture in the nonaqueous electrolytic solution, which is a cause of decomposition or the like of the electrolyte salt, is as small as possible. Specifically, it is preferable that an amount of the moisture in the nonaqueous electrolytic solution is not more than 50 ppm. The amount of the moisture can be, for example, measured by the Karl Fischer's method or the like.

Also, it is preferable that a content of the acid component in the nonaqueous electrolytic solution, which causes decomposition of the nonaqueous electrolytic solution and corrosion of metal materials, is as small as possible. Specifically, it is preferable that an amount of the acid component in the nonaqueous electrolytic solution is not more than 100 ppm. Here, the acid component refers to a protic acid such as HF. The amount of the acid component in the nonaqueous electrolytic solution can be, for example, measured by using an acid-base titration method or the like.

The heteropolyacid salt compound according to the first embodiment is constituted of a heteropolyacid which is a condensate of two or more kinds of an oxoacid. In the first embodiment according to the present invention, it is preferable that the heteropolyacid has a structure in which it is easily soluble in the solvent of the battery, such as the Keggin structure as in the formula (I) and the Preyssler structure as in the formula (II). Also, a heteropolyacid having the Anderson structure or the Dawson structure, in which the acid component proton is not more than a half of the salt, is preferable.

The heteropolyacid salt compound and the heteropolyacid constituting the heteropolyacid salt compound are one having a polyatom selected from the following element group (a); or one having a polyatom selected from the following element group (a), in which a part of the polyatoms is substituted with at least any one element selected from the following element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Also, the heteropolyacid salt compound and the heteropolyacid are one having a hetero atom selected from the following element group (c); or one having a hetero atom selected from the following element group (c), in which a part of the hetero atoms is substituted with at least any one element selected from the following element group (d).

Element group (c): B, Al, Si, P, Cr, Mn, Fe, Co, Ni, Cu, Zn, Ge, As
Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, Np Examples of the heteropolyacid contained in the heteropolyacid salt compound which is used in the first embodiment according to the present invention include heteropolytungstic acids such as phosphotungstic acid and silicotungstic acid; and heteropolymolybdic acids such as phosphomolybdic acid and silicomolybdic acid. Also, as a material containing plural polyelements, materials such as phosphovanadomolybdic acid, phosphotungstomolybdic acid, silicovanadomolybdic acid and silicotungstomolybdic acid can be used.

In an embodiment, the heteropolyacid salt compound has a cation, for example, $Li^+$, $Na^+$, $K^+$, $Rb^+$, $Cs^+$, $R_4N^+$, $R_4P^+$, etc., wherein R is H or a hydrocarbon group having not more than 10 carbon atoms. Also, the cation is more preferably $Li^+$, tetra-n-butylammonium or tetra-n-butylphosphonium.

Examples of such a heteropolyacid salt compound include heteropolytungstic acid compounds such as sodium silicotungstate, sodium phosphotungstate, ammonium phosphotungstate and a silicotungstic acid tetra-tetra-n-butylphosphonium salt. Also, examples of the heteropolyacid compound include heteropolymolybdic acid compounds such as sodium phosphomolybdate, ammonium phosphomolybdate and a phosphomolybdic acid tri-tetra-n-butylammonium salt. Furthermore, examples of a compound containing plural polyacids include materials such as a phosphotungstomolybdic acid tri-tetra-n-ammonium salt. Such a heteropolyacid or heteropolyacid compound may be used in admixture of two or more kinds thereof. Such a heteropolyacid or heteropolyacid compound is easily soluble in the solvent, is stable in the battery and is hard to give adverse influences such as a reaction with other material.

Also, in the first embodiment, a polyacid compound may be used. As the polyacid compound, an isopolyacid compound can be used together with the heteropolyacid compound. Also, the isopolyacid compound tends to be slightly deteriorated in an effect per addition weight as compared with the heteropolyacid compound. However, since the isopolyacid compound is low in solubility in a polar solvent, when applied to a positive electrode or a negative electrode, it has excellent aspects in coating characteristics such as viscoelasticity and its change with time, so that it has usefulness from the industrial viewpoint.

Similar to the heteropolyacid salt compound, the polyacid compound according to the first embodiment is one having a polyatom selected from the following element group (a); or one having a polyatom selected from the following element group (a), in which a part of the polyatoms is substituted with at least any one element selected from the following element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Examples of the polyacid contained in the polyacid compound which is used in the first embodiment according to the present invention include tungstic(VI) acid and molybdic(VI) acid. Specific examples thereof include tungstic anhydride, molybdic anhydride and hydrates thereof. Examples of the hydrate which can be used include orthotungstic acid ($H_2WO_4$) which is tungstic acid monohydrate ($WO_3.H_2O$), molybdic acid dihydrate ($H_4MoO_5$, $H_2MoO_4.H_2O$ or $MoO_3.2H_2O$) and orthomolybdic acid ($H_2MoO_4$) which is molybdic acid monohydrate ($MoO_3.H_2O$). Also, tungstic anhydride ($WO_3$) having a smaller hydrogen content than metatungstic acid, paratungstic acid and the like which are an isopolyacid of the foregoing hydrate, and ultimately having a zero hydrogen content; molybdic anhydride ($MoO_3$) having a smaller hydrogen content than metamolybdic acid, paramolybdic acid and the like, and ultimately having a zero hydrogen content; and the like can be used.

The nonaqueous electrolytic solution contains at least one of the compounds represented by the foregoing formulae (I) and (II). Also, a combination of two or more kinds of the compounds represented by the formulae (I) and (II) can be used. By adding the polyacid salt compound having such a structure in which the proton and moisture are removed to the nonaqueous electrolytic solution, it is possible to control the moisture content in the nonaqueous electrolytic solution and to suppress the production of a free acid regardless of the addition amount of the heteropolyacid salt compound.

Also, a content of the heteropolyacid salt compound composed of at least one of the compounds represented by the formulae (I) and (II) in the nonaqueous electrolytic solution is preferably 0.01% by weight or more and not more than 3% by weight from the viewpoint of battery blister after the initial charge, and more preferably 1.0% by weight or more and not more than 3.0% by weight from the viewpoint of battery blister after each of the initial charge and the high-temperature storage. When the content of the heteropolyacid salt compound is too small, the formation of SEI is insufficient, so that the effect to be brought by adding the heteropolyacid salt compound is hardly obtainable. Also, what the content of the heteropolyacid salt compound is too large is not preferable because an irreversible capacity by the reaction becomes excessively large, so that the battery capacity is lowered.

Furthermore, a lithium fluoride salt such as lithium hexafluorophosphate ($LiPF_6$) and lithium tetrafluoroborate ($LiBF_4$) may be jointly used and added to the nonaqueous electrolytic solution. According to this, since aluminum fluoride or the like derived from the lithium salt is produced, the corrosion to be caused due to, for example, the moisture and acid component in the heteropolyacid salt compound can be more effectively prevented from occurring.

In the heteropolyacid salt compound according to the first embodiment as shown by the formulae (I) and (II), the acid component ($H_x$ in the formula (I) or $H_p$ in the formula (II)) may exist together with the salt ($A_y$ in the formula (I) or $A_q$ in the formula (II)) within the compound. Also, for example, as described previously, it is preferable that the amount of the moisture and the amount of the acid component in the nonaqueous electrolytic solution are not more than 50 ppm and not more than 100 ppm, respectively. So far as the amount of the moisture and the amount of the acid component fall within the foregoing ranges, a mixture of a salt-free heteropolyacid with the heteropolyacid salt compound according to the first embodiment may be used.

(1-2) Synthesis Method of Heteropolyacid Salt Compound

Though a synthesis method of the heteropolyacid salt compound according to the first embodiment is not particularly limited, examples of the synthesis method include a method of mixing a heteropolyacid with an acid salt, a hydroxide or the like; and a method of mixing tungsten oxide, molybdenum oxide and an acid salt. The heteropolyacid salt is isolated by a method such as crystallization separation and vacuum drying. Also, the structure of the synthesized heteropolyacid salt compound can be confirmed by means of X-ray diffraction or UV or IR measurement.

Also, the nonaqueous electrolytic solution containing the heteropolyacid salt compound according to the first embodiment may be prepared by a method of mixing the solvent and the heteropolyacid to be used for the nonaqueous electrolytic solution, followed by dehydration by azeotrope or with a drying agent, acid component removal by ion exchange, or other method.

(1-3) Constitution of Nonaqueous Electrolytic Solution Having a Heteropolyacid Salt Compound Added Thereto

[Electrolyte Salt]

The electrolyte salt may, for example, contain one or two or more kinds of a light metal salt such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride ($LiCl$) and lithium bromide ($LiBr$). Above all, at least one member selected from the group consisting of lithium hexafluorophosphate ($LiPF_6$), lithium tetrafluoroborate ($LiBF_4$), lithium perchlorate ($LiClO_4$) and lithium hexafluoroarsenate ($LiAsF_6$) is preferable, and lithium hexafluorophosphate ($LiPF_6$) is more preferable. This is because the resistance of the nonaqueous electrolyte is lowered. In particular, it is preferable to use lithium tetrafluoroborate ($LiBF_4$) together with lithium hexafluorophosphate ($LiPF_6$). This is because high effects are obtainable.

[Nonaqueous Solvent]

Examples of the nonaqueous solvent which can be used include ethylene carbonate (EC), propylene carbonate (PC), butylene carbonate (BC), dimethyl carbonate (DMC), diethyl carbonate (DEC), ethyl methyl carbonate (EMC), methyl propyl carbonate (MPC), γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide. This is because excellent capacity, cycle characteristic and storage characteristic are obtainable in electrochemical devices provided with a nonaqueous electrolyte, such as batteries. These materials may be used singly or in admixture of plural kinds thereof.

Above all, it is preferable to use one containing, as the solvent, at least one member selected from the group consisting of ethylene carbonate (EC), propylene carbonate (PC), dimethyl carbonate (DMC), diethyl carbonate (DEC) and ethyl methyl carbonate (EMC). This is because sufficient effects are obtainable. In that case, in particular, it is preferable to use one containing a mixture of ethylene carbonate or propylene carbonate, each of which is a high viscosity (high dielectric constant) solvent (for example, specific dielectric constant $\in \geq 30$), and dimethyl carbonate, diethyl carbonate or ethyl methyl carbonate, each of which is a low viscosity solvent (for example, viscosity ≤1 mPa·s). This is because dissociation properties of the electrolyte salt and mobility of ions are enhanced, so that higher effects are obtainable.

In an embodiment, the electrolytic solution contains a cyclic carbonate represented by the following formula (III) or (IV). A combination of two or more kinds selected from the compounds represented by the formulae (III) and (IV) can also be used.

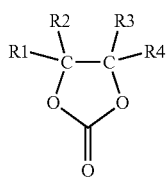

(III)

In the formula (III), each of R1 to R4 represents a hydrogen group, a halogen group, an alkyl group or a halogenated alkyl group, provided with at least one of R1 to R4 represents a halogen group or a halogenated alkyl group.

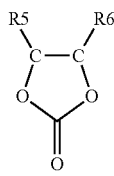

(IV)

In the formula (IV), each of R5 and R6 represents a hydrogen group or an alkyl group.

Examples of the cyclic carbonate having a halogen represented by the formula (III) include 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one and 4-fluoro-4-methyl-1,3-dioxolan-2-one. These materials may be used singly or in admixture of plural kinds thereof. Of these, 4-fluoro-1,3-dioxolan-2-one and 4,5-difluoro-1,3-dioxolan-2-one are preferable. This is because not only these materials are easily available, but high effects are obtainable.

Examples of the cyclic carbonate having an unsaturated bond represented by the formula (IV) include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 1,3-dioxol-2-one and 4-trifluoromethyl-1,3-dioxol-2-one. These materials may be used singly or in admixture of plural kinds thereof. Of these, vinylene carbonate is preferable. This is because not only this material is easily available, but high effects are obtainable.

[Polymer Compound]

In the first embodiment, the nonaqueous electrolytic solution having the nonaqueous solvent and the electrolyte salt mixed therein may contain a holding material containing a polymer compound to form a so-call gel.

A material capable of being gelled upon absorbing the solvent therein is useful as the polymer compound. Examples thereof include fluorocarbon based polymer compounds such as polyvinylidene fluoride and a copolymer of vinylidene fluoride and hexafluoropropylene; ether based polymer compounds such as polyethylene oxide and a crosslinked material containing polyethylene oxide; and compounds containing, as a repeating unit, polyacrylonitrile, polypropylene oxide or polymethyl methacrylate. The polymer compound may be used singly or in admixture of two or more kinds thereof.

In particular, from the standpoint of oxidation-reduction stability, fluorocarbon based polymer compounds are desirable; and above all, a copolymer containing, as components, vinylidene fluoride and hexafluoropropylene is preferable. Furthermore, this copolymer may contain, as a component, a monoester of an unsaturated dibasic acid such as monomethyl maleate, a halogenated ethylene such as trifluorochloroethylene, a cyclic carbonate of an unsaturated compound such as vinylene carbonate, an epoxy group-containing acryl vinyl monomer or the like. This is because higher characteristics are obtainable.

A method for forming the electrolyte layer in a gel form is described later.

<Effect>

In the first embodiment according to the present invention, the heteropolyacid salt compound represented by at least one of the formulae (I) and (II) is contained in the nonaqueous electrolytic solution. According to this, the amounts of the moisture and the acid component in the nonaqueous electrolytic solution can be lowered. Then, by using such a nonaqueous electrolytic solution for the nonaqueous electrolyte battery, a coating is formed on a negative electrode surface, whereby an effect for suppressing a side reaction of the nonaqueous electrolytic solution is obtainable.

2. Second Embodiment

The nonaqueous electrolyte battery in the second embodiment is a cylindrical type nonaqueous electrolyte battery.

(2-1) Configuration of Nonaqueous Electrolyte Battery

Figure 2:
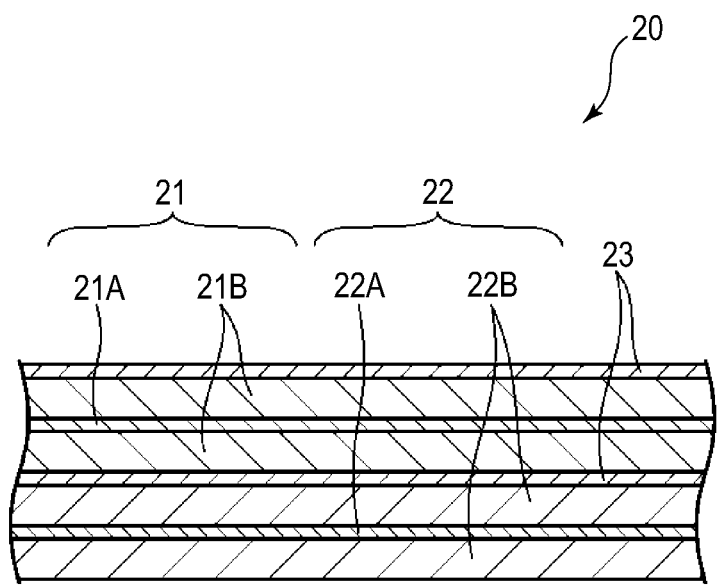
FIG. 2 is a sectional view showing enlargedly a part of a wound electrode body in FIG. 1.

FIG. 1 shows a sectional configuration of the nonaqueous electrolyte battery according to the second embodiment. FIG. 2 shows enlargedly a part of a wound electrode body 20 shown in FIG. 1. This nonaqueous electrolyte battery is, for example, a lithium ion secondary battery in which a capacity of a negative electrode is expressed on the basis of intercalation and deintercalation of lithium as an electrode reactant.

[Entire Configuration of Nonaqueous Electrolyte Battery]

In this nonaqueous electrolyte battery, a wound electrode body 20 in which a positive electrode 21 and a negative electrode 22 are laminated via a separator 23 and wound and a pair of insulating plates 12 and 13 are housed mainly in the inside of a substantially hollow columnar battery can 11. A battery structure using this columnar battery can 11 is called a cylindrical type.

The battery can 11 is constituted of, for example, iron (Fe) plated with nickel (Ni), and one end thereof is closed, with the other end being opened. In the inside of the battery can 11, a pair of the insulating plates 12 and 13 is respectively disposed vertical to the winding peripheral face so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed.

The battery lid 14 is, for example, constituted of the same material as that in the battery can 11. The safety valve mechanism 15 is electrically connected to the battery lid 14 via the positive temperature coefficient device 16. In this safety valve mechanism 15, when the internal pressure of the battery reaches a fixed value or more due to an internal short circuit or heating from the outside or the like, a disc plate 15A is reversed, whereby electrical connection between the battery lid 14 and the wound electrode body 20 is disconnected.

When the temperature rises, the positive temperature coefficient device 16 controls the current by an increase of the resistance value, thereby preventing abnormal heat generation to be caused due to a large current. The gasket 17 is, for example, constituted of an insulating material, and asphalt is coated on the surface thereof.

For example, a center pin 24 is inserted in the center of the wound electrode body 20. In the wound electrode body 20, a positive electrode lead 25 made of aluminum (Al) or the like is connected to the positive electrode 21; and a negative electrode lead 26 made of nickel (Ni) or the like is connected to the negative electrode 22. The positive electrode lead 25 is electrically connected to the battery lid 14 by means of welding to the safety valve mechanism 15; and the negative electrode lead 26 is electrically connected to the battery can 11 by means of welding.

[Positive Electrode]

The positive electrode 21 is, for example, one in which a positive electrode active material layer 21B is provided on the both surfaces of a positive electrode collector 21A having a pair of surfaces opposing to each other. However, the positive electrode active material layer 21B may be provided on only one surface of the positive electrode collector 21A. A coating derived from at least one of the heteropolyacid salt compounds represented by the formulae (I) and (II) is formed on the positive electrode surface. A deposit deposited by electrolysis of the heteropolyacid salt compound by preliminary charge or charge is contained in the formed coating. This deposit contains a polyacid and/or a polyacid compound. The deposit deposited on the positive electrode is formed depending upon the amount of the heteropolyacid salt compound to be added into the battery system.

The positive electrode collector 21A is, for example, constituted of a metal material such as aluminum, nickel and stainless steel.

The positive electrode active material layer 21B contains, as a positive electrode active material, one or two or more kinds of a positive electrode material capable of intercalating and deintercalating lithium and may further contain other material such as a binder and a conductive agent, if desired.

As the positive electrode material capable of intercalating and deintercalating lithium, for example, a lithium-containing compound is preferable. This is because a high energy density is obtainable. Examples of this lithium-containing compound include a complex oxide containing lithium and a transition metal element and a phosphate compound containing lithium and a transition metal element. Of these, a compound containing at least one member selected from the group consisting of cobalt, nickel, manganese and iron as the transition metal element is preferable. This is because a higher voltage is obtainable.

Examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ ((v+w)<1)), and a lithium manganese complex oxide ($LiMn_2O_4$) or a lithium manganese nickel complex oxide ($LiMn_{2-t}Ni_tO_4$ (t<2)) each having a spinel type structure. Of these, cobalt-containing complex oxides are preferable. This is because not only a high capacity is obtainable, but an excellent cycle characteristic is obtainable. Also, examples of the phosphate compound containing lithium and a transition metal element include a lithium iron phosphate compound ($LiFePO_4$) and a lithium iron manganese phosphate compound ($LiFe_{1-u}Mn_uPO_4$ (u<1)).

Moreover, from the viewpoint that higher electrode filling properties and cycle characteristic are obtainable, the positive electrode material capable of intercalating and deintercalating lithium may be formed as a complex particle obtained by coating the surface of a core particle composed of any one of the foregoing lithium-containing compounds by a fine particle composed of any one of other lithium-containing compounds.

Besides, examples of the positive electrode material capable of intercalating and deintercalating lithium include oxides such as titanium oxide, vanadium oxide and manganese dioxide; disulfides such as titanium disulfide and molybdenum sulfide; chalcogenides such as niobium selenide; sulfur; and conductive polymers such as polyaniline and polythiophene. As a matter of course, the positive electrode material capable of intercalating and deintercalating lithium may be other material than those described above. Also, the above-exemplified series of positive electrode materials may be a mixture of two or more kinds thereof in an arbitrary combination.

[Negative Electrode]

The negative electrode 22 is, for example, one in which a negative electrode active material layer 22B is provided on the both surfaces of a negative electrode collector 22A having a pair of surfaces opposing to each other. However, the negative electrode active material layer 22B may be provided on only one surface of the negative electrode collector 22A. A coating derived from at least one of the heteropolyacid salt compounds represented by the formulae (I) and (II) is formed on the negative electrode surface. The formed coating contains a deposit deposited in a three-dimensional network structure upon electrolysis of the heteropolyacid salt compound by preliminary charge or charge. The coating is formed on the surface of at least a part of the negative electrode and contains an amorphous polyacid and/or polyacid compound containing one or more kinds of a polyelement, and the amorphous polyacid and/or polyacid compound contains the electrolytic solution and takes a gel form.

Figure 3:
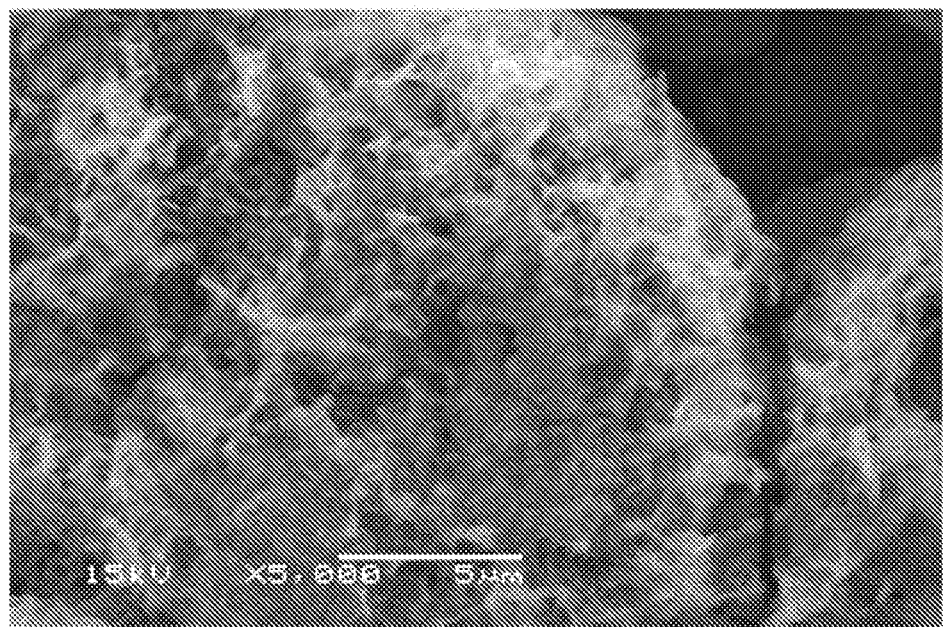
FIG. 3 is an SEM photograph of a negative electrode surface according to an embodiment.

The coating in a gel form formed on the negative electrode surface according to the second embodiment which contains the amorphous polyacid and/or polyacid compound composed of one or more kinds of a polyelement, can be, for example, confirmed by SEM (scanning electron microscope) as shown in FIG. 3. FIG. 3 is an SEM image of the negative electrode surface after charge and is a photograph taken after washing the electrolytic solution and then drying.

Also, the deposition of the amorphous polyacid and/or polyacid compound can be confirmed on the basis of structural analysis of the coating formed on the negative electrode surface by the X-ray absorption fine structure (XAFS) analysis and chemical information of a molecule by the time-of-flight secondary ion mass spectrometry (ToF-SIMS).

Figure 4:
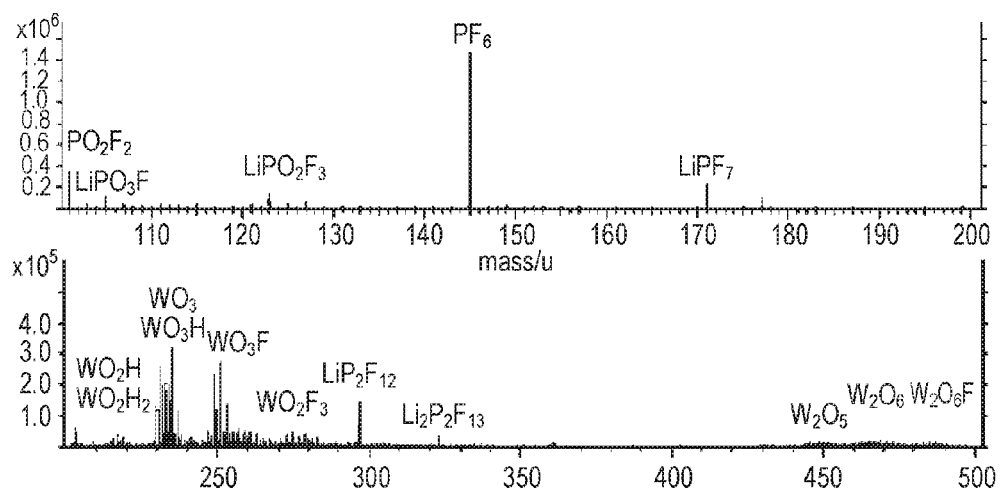
FIG. 4 is a diagram showing an example of a secondary ion spectrum by the time-of-flight secondary ion mass spectrometry (ToF-SIMS) on a negative electrode surface on which a deposit is deposited by adding silicotungstic acid into a battery system.

FIG. 4 shows an example of a secondary ion spectrum by the time-of-flight secondary ion mass spectrometry (ToF-SIMS) on the negative electrode surface of the nonaqueous electrolyte battery in which the negative electrode coating according to the second embodiment is formed by adding silicotungstic acid into a battery system and charging the battery. It is noted from FIG. 4 that a molecule containing, as constituent elements, tungsten (W) and oxygen (O) is existent.

Figure 5:
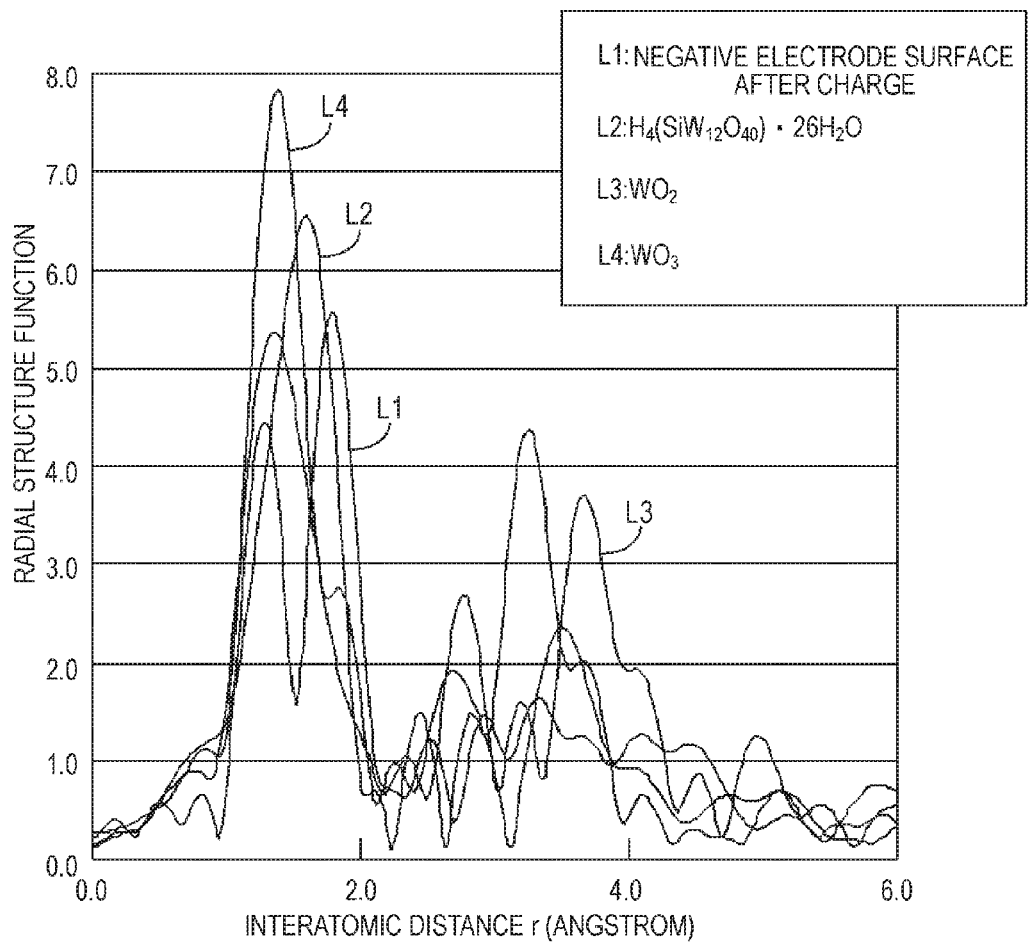
FIG. 5 is a diagram showing an example of a radial structure function of a W—O bond obtained by the Fourier transformation of a spectrum by the X-ray absorption fine structure (XAFS) analysis on a negative electrode surface on which a deposit is deposited by adding silicotungstic acid into a battery system.

Also, FIG. 5 shows an example of a radial structure function of a W—O bond obtained by the Fourier transformation of a spectrum by the X-ray absorption fine structure (XAFS)

analysis on the negative electrode surface of the nonaqueous electrolyte battery in which the negative electrode coating according to the second embodiment is formed by adding silicotungstic acid into a battery system and charging the battery. Also, FIG. 5 shows an example of a radial structure function of a W—O bond of each of tungstic acid ($WO_3$ or $WO_2$) as a polyacid which can be used in the second embodiment and silicotungstic acid ($H_4(SiW_{12}O_{40}).26H_2O$) as a heteropolyacid which can be used in the second embodiment according to the embodiment, along with the analysis results of the negative electrode coating.

It is noted from FIG. 5 that a peak L1 of a deposit on the negative electrode surface has peaks at a different position from peaks L2, L3 and L4 of silicotungstic acid ($H_4(SiW_{12}O_{40}).26H_2O$), tungsten dioxide ($WO_2$) and tungsten trioxide ($WO_3$), respectively and has a different structure. In tungsten trioxide ($WO_3$) and tungsten dioxide ($WO_2$), both of which are a typical tungsten oxide, and silicotungstic acid ($H_4(SiW_{12}O_{40}).26H_2O$) which is a starting material of the second embodiment, in view of the radical structure function, main peaks are existent in the range of from 1.0 to 2.0 angstroms, and peaks can also be confirmed in the range of from 2.0 to 4.0 angstroms.

On the other hand, in the distribution of the W—O bond distance of the polyacid composed mainly of tungstic acid deposited on each of the positive electrode and the negative electrode in the second embodiment, though the peaks are confirmed within the range of from 1.0 to 2.0 angstroms, distinct peaks equivalent to those in the peak L1 are not found in the outside of the foregoing range. That is, no peak is substantially observed in the range exceeding 3.0 angstroms. In such a situation, it is confirmed that the deposit on the negative electrode surface is amorphous.

The negative electrode collector 22A is, for example, constituted of a metal material such as copper, nickel and stainless steel.

The negative electrode active material layer 22B contains, as a negative electrode active material, one or two or more kinds of a negative electrode material capable of intercalating and deintercalating lithium and may further contain other material such as a binder and a conductive agent, if desired. On that occasion, a rechargeable capacity on the negative electrode material capable of intercalating and deintercalating lithium is larger than a discharge capacity of the positive electrode. Details regarding the binder and the conductive agent are the same as those in the positive electrode.

Examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, an excellent cycle characteristic is obtainable, and the carbon material also functions as a conductive agent. The shape of the carbon material may be any of a fibrous shape, a spherical shape, a granular shape or a flaky shape.

In addition to the foregoing carbon materials, examples of the negative electrode material capable of intercalating and deintercalating lithium include a material capable of intercalating and deintercalating lithium and containing, as a constituent element, at least one member selected from the group consisting of metal elements and semi-metal elements. This is because a high energy density is obtainable. Such a negative electrode material may be a simple substance, an alloy or a compound of a metal element or a semi-metal element, or may be one having one or two or more kinds of a phase in at least a part thereof. The "alloy" as referred to herein includes, in addition to alloys composed of two or more kinds of a metal element, alloys containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Of these, at least one member selected from silicon and tin is preferable, and silicon is more preferable. This is because silicon and tin have large capability to intercalate and deintercalate lithium, so that a high energy density is obtainable.

Examples of the negative electrode material containing at least one member selected from silicon and tin include a simple substance, an alloy or a compound of silicon; a simple substance, an alloy or a compound of tin; and one having one kind or two or more kinds of a phase in at least a part thereof.

Examples of alloys of silicon include alloys containing, as a second constituent element other than silicon, at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin or compounds of silicon include compounds containing oxygen (O) or carbon (C), and these compounds may further contain the foregoing second constituent element in addition to tin (Sn) or silicon (Si).

As the negative electrode material containing at least one member selected from silicon (Si) and tin (Sn), for example, a material containing tin (Sn) as a first constituent element and in addition to this tin (Sn), a second constituent element and a third constituent element is especially preferable. As a matter of course, this negative electrode material may be used together with the foregoing negative electrode material. The second constituent element is at least one member selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one member selected from the group consisting of boron (B), carbon (C), aluminum (Al) and phosphorus (P). This is because when the second constituent element and the third constituent element are contained, a cycle characteristic is enhanced.

Above of all, the negative electrode material is preferably an SnCoC-containing material containing tin (Sn), cobalt (Co) and carbon (C) as constituent elements and having a content of carbon (C) in the range of 9.9% by mass or more and not more than 29.7% by mass and a proportion of cobalt (Co) to the total sum of tin (Sn) and cobalt (Co) (Co/(Sn+Co)) in the range of 30% by mass or more and not more than 70% by mass. This is because in the foregoing composition range, not only a high energy density is obtainable, but an excellent cycle characteristic is obtainable.

This SnCoC-containing material may further contain other constituent element, if desired. As other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi) are preferable. The SnCoC-containing material may contain two or more kinds of these elements. This is because a capacity characteristic or a cycle characteristic is more enhanced.

The SnCoC-containing material has a phase containing tin (Sn), cobalt (Co) and carbon (C), and it is preferable that this phase has a lowly crystalline or amorphous structure. Also, in the SnCoC-containing material, it is preferable that at least a part of carbon as the constituent element is bound to a metal element or a semi-metal element as other constituent element. This is because though it may be considered that a lowering of the cycle characteristic is caused due to aggregation or crystallization of tin (Sn) or the like, when carbon is bound to other element, such aggregation or crystallization is suppressed.

Examples of a measurement method for examining the binding state of elements include X-ray photoelectron spectroscopy (XPS). In this XPS, so far as graphite is concerned, a peak of the 1s orbit (C1s) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the is orbit (C1s) of carbon appears at 284.8 eV. On the contrary, when a charge density of the carbon element is high, for example, when carbon is bound to a metal element or a semi-metal element, the peak of C1s appears in a lower region than 284.5 eV. That is, when a peak of a combined wave of C1s obtained regarding the SnCoC-containing material appears in a lower region than 284.5 eV, at least a part of carbon (C) contained in the SnCoC-containing material is bound to a metal element or a semi-metal element as other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the lowest binding energy side is used as an energy reference (284.8 eV).

Also, examples of the negative electrode material capable of intercalating and deintercalating lithium include metal oxides and polymer compounds, each of which is capable of intercalating and deintercalating lithium. Examples of the metal oxide include iron oxide, ruthenium oxide and molybdenum oxide; and examples of the polymer compound include polyacetylene, polyaniline and polypyrrole.

The negative electrode material capable of intercalating and deintercalating lithium may be other material than those described above. Also, the above-exemplified negative electrode materials may be a mixture of two or more kinds thereof in an arbitrary combination.

The negative electrode active material layer 22B may be, for example, formed by any of a vapor phase method, a liquid phase method, a spraying method, a baking method or a coating method, or a combined method of two or more kinds of these methods. When the negative electrode active material layer 22B is formed by adopting a vapor phase method, a liquid phase method, a spraying method, a baking method or a combined method of two or more kinds of these methods, it is preferable that the negative electrode active material layer 22B and the negative electrode collector 22A are alloyed on at least a part of an interface therebetween. Specifically, it is preferable that on the interface, the constituent elements of the negative electrode collector 22A are diffused into the negative electrode active material layer 22B, the constituent elements of the negative electrode active material layer 22B are diffused into the negative electrode collector 22A, or these constituent elements are mutually diffused into each other. This is because not only breakage to be caused due to expansion and shrinkage of the negative electrode active material layer 22B following the charge/discharge can be suppressed, but electron conductivity between the negative electrode active material layer 22B and the negative electrode collector 22A can be enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and electroless plating can be adopted. The baking method as referred to herein is, for example, a method in which after a granular negative electrode active material is mixed with a binder and the like, the mixture is dispersed in a solvent and coated, and the coated material is then heat treated at a higher temperature than a melting point of the binder or the like. As to the baking method, known techniques can be utilized, too, and examples thereof include an atmospheric baking method, a reaction baking method and a hot press baking method.

[Separator]

The separator 23 partitions the positive electrode 21 and the negative electrode 22 from each other and allows a lithium ion to pass therethrough while preventing a short circuit of the current to be caused due to the contact between the both electrodes. This separator 23 is constituted of, for example, a porous film made of a synthetic resin such as polytetrafluoroethylene, polypropylene and polyethylene; a porous film made of a ceramic; or the like, and a laminate of two or more kinds of these porous films may also be used. The separator 23 may be impregnated with the electrolytic solution according to the foregoing first embodiment.

(2-2) Manufacturing Method of Nonaqueous Electrolyte Battery:

The foregoing nonaqueous electrolyte battery can be manufactured in the following manner.

[Manufacture of Positive Electrode]

First of all, the positive electrode 21 is fabricated. For example, a positive electrode material, a binder and a conductive agent are mixed to form a positive electrode mixture, which is then dispersed in an organic solvent to form a positive electrode mixture slurry in a paste form. Subsequently, the positive electrode mixture slurry is uniformly coated on the both surfaces of the positive electrode collector 21A by a doctor blade or a bar coater or the like and then dried. Finally, the coating is subjected to compression molding by a roll press or the like while heating, if desired, thereby forming the positive electrode active material layer 21B. In that case, the compression molding may be repeatedly carried out plural times.

[Manufacture of Negative Electrode]

Next, the negative electrode 22 is fabricated. For example, a negative electrode material and a binder and optionally, a conductive agent are mixed to form a negative electrode mixture, which is then dispersed in an organic solvent to form a negative electrode mixture slurry in a paste form. Subsequently, the negative electrode mixture slurry is uniformly coated on the both surfaces of the negative electrode collector 22A by a doctor blade or a bar coater or the like and then dried. Finally, the coating is subjected to compression molding by a roll press or the like while heating, if desired, thereby forming the negative electrode active material layer 22B.

[Assembling of Nonaqueous Electrolyte Battery]

Next, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded to the safety valve mechanism 15; and a tip end of the negative electrode lead 26 is also welded to the battery can 11. Then, the wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, the nonaqueous electrolytic solution according to the first embodiment is injected into the inside of the battery can 11 and impregnated in the separator 23. Thereafter, the battery lid 14, the safety valve mechanism 15 and the positive temperature coefficient device 16 are fixed to the open end of the battery can 11 upon being caulked via the gasket 17. There is thus completed the nonaqueous electrolyte battery shown in FIGS. 2 and 3.

In such a nonaqueous electrolyte battery, at least one of the heteropolyacid salt compounds represented by the formulae (I) and (II) contained in the nonaqueous electrolytic solution is electrolyzed and deposited at the time of initial charge, thereby forming a coating on the negative electrode surface. In view of the fact that the nonaqueous electrolytic solution contains at least one of the heteropolyacid salt compounds represents by the formulae (I) and (II), this compound capable of intercalating and deintercalating a lithium ion forms a stable SEI coating on the negative electrode by charge/discharge at the initial stage of use, thereby suppressing decomposition of the solvent and the electrolyte salt in the nonaqueous electrolytic solution. The SEI coating formed by the heteropolyacid and/or the heteropolyacid compound is inorganic and firm and is simultaneously small in resistance on the occasion of intercalating and deintercalating a lithium ion, and therefore, it may be considered that deterioration of the capacity or the like is hardly caused. Furthermore, it may be considered that when a monofluorophosphate and/or a difluorophosphate which is closed in the component to the lithium salt in the electrolytic solution is added together with the heteropolyacid and/or the heteropolyacid compound, decomposition of the main electrolyte salt is more suppressed, whereby the SEI coating with a low resistance can be formed.

In view of the fact that the electrolytic solution in which at least one of the heteropolyacid salt compounds represented by the formulae (I) and (II) is dissolved is impregnated in the negative electrode active material layer 22B, a compound derived from at least one of the heteropolyacid salt compounds represented by the formulae (I) and (II) may be deposited within the negative electrode active material layer 22B by charge or preliminary charge. According to this, the compound derived from at least one of the heteropolyacid salt compounds represented by the formulae (I) and (II) may exist among negative electrode active material particles.

Also, in view of the fact that the electrolytic solution in which at least one of the heteropolyacid salt compounds represented by the formulae (I) and (II) is dissolved is impregnated in the positive electrode active material layer 21B, a compound derived from at least one of the heteropolyacid salt compounds represented by the formulae (I) and (II) may be deposited within the positive electrode active material layer 21B by charge or preliminary charge. According to this, the compound derived from at least one of the heteropolyacid salt compounds represented by the formulae (I) and (II) may exist among positive electrode active material particles.

The presence or absence of the compound derived from at least one of the heteropolyacid salt compounds represented by the formulae (I) and (II) in the negative electrode coating can be, for example, confirmed by the X-ray photoelectron spectroscopy (XPS) analysis or time-of-flight secondary ion mass spectrometry (ToF-SIMS). In that case, the battery is disassembled, followed by washing with dimethyl carbonate. This is made for the purpose of removing a solvent component with low volatility and an electrolyte salt existing on the surface. It is desirable that sampling is carried out in an inert atmosphere if it is at all possible.

<Effect>

In the second embodiment, at least one of the heteropolyacid salt compounds represented by the formulae (I) and (II) is contained in the nonaqueous electrolytic solution. According to this, not only the deterioration in battery characteristics at the time of initial charge is suppressed, but a side reaction of the electrode active material and the nonaqueous electrolytic solution in a high-temperature environment is suppressed, so that the battery characteristics are improved. The addition of the heteropolyacid salt compound according to the second embodiment can be applied to both a primary battery and a secondary battery because the effects are obtainable at the time of initial charge and also at the time of high-temperature storage.

3. Third Embodiment

A nonaqueous electrolyte battery according to a third embodiment is described. The nonaqueous electrolyte battery according to the third embodiment is a laminated film type nonaqueous electrolyte battery packaged by a laminated film.

(3-1) Configuration of Nonaqueous Electrolyte Battery

Figure 6:
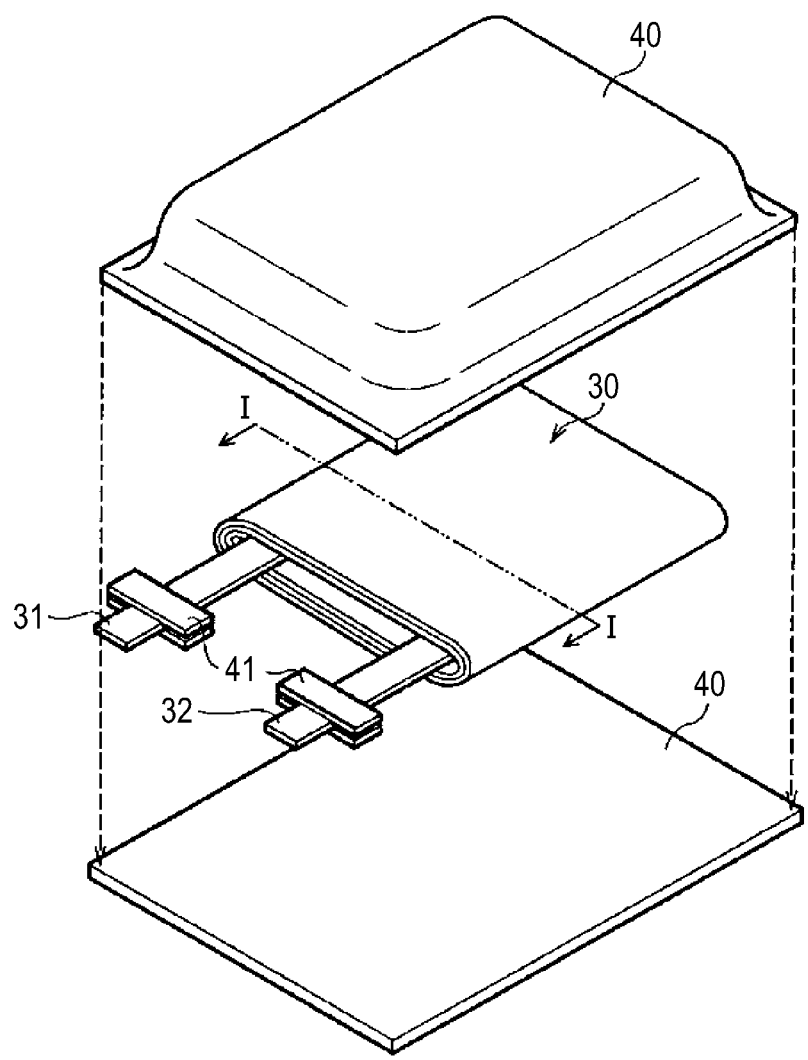
FIG. 6 is an exploded perspective view showing a configuration example of a nonaqueous electrolyte battery according to an embodiment.
Figure 7:
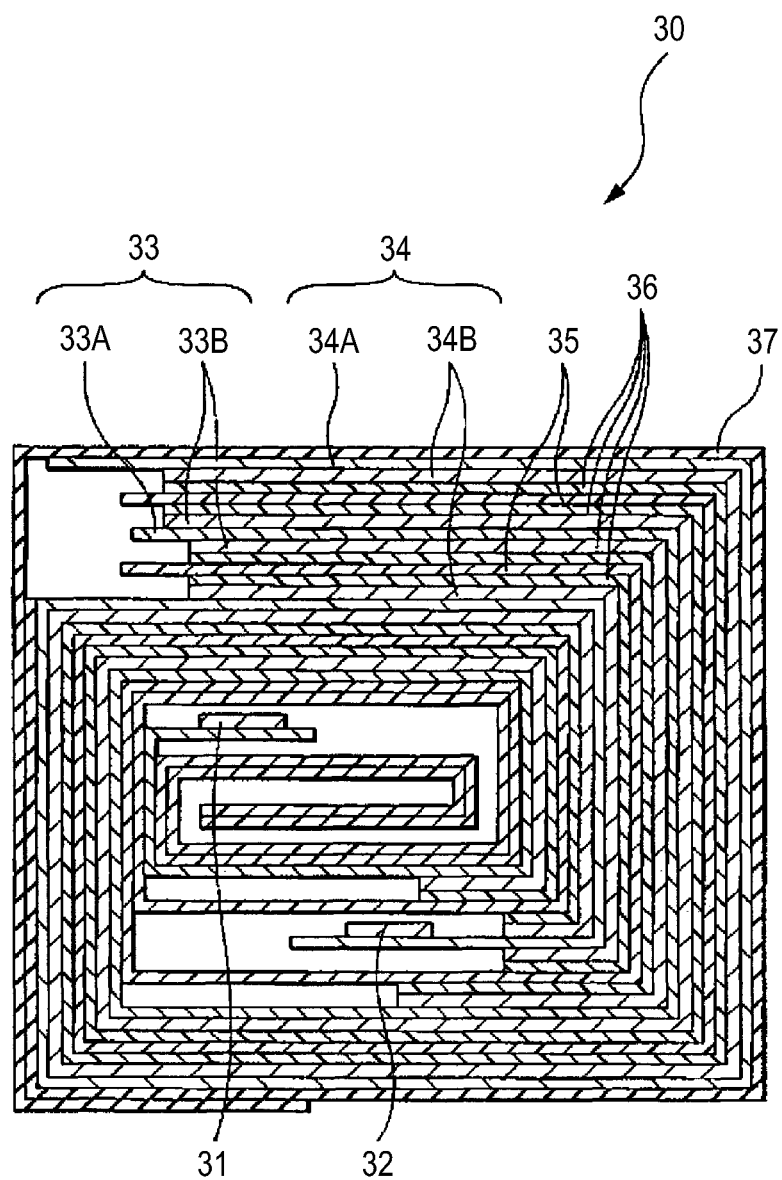
FIG. 7 is a sectional view along an I-I line of a wound electrode body shown in FIG. 6.

The nonaqueous electrolyte battery according to the third embodiment is described. FIG. 6 is an exploded perspective configuration example of the nonaqueous electrolyte battery according to the third embodiment; and FIG. 7 shows enlargedly a section along an I-I line of a wound electrode body 30 shown in FIG. 6.

This nonaqueous electrolyte battery has a configuration in which the wound electrode body 30 having mainly a positive electrode lead 31 and a negative electrode lead 32 installed therein is housed in the inside of a film-shaped package member 40. A battery structure using this film-shaped package member 40 is called a laminated film type.

Each of the positive electrode lead 31 and the negative electrode lead 32 is, for example, led out from the inside of the package member 40 toward the outside in the same direction. The positive electrode lead 31 is, for example, constituted of a metal material such as aluminum, and the negative electrode lead 32 is, for example, constituted of a metal material such as copper, nickel and stainless steel. Such a metal material is, for example, formed in a thin plate state or a network state.

The package member 40 is, for example, constituted of an aluminum laminated film obtained by sticking a nylon film, an aluminum foil and a polyethylene film in this order. For example, this package member 40 has a structure in which respective outer edges of the two rectangular aluminum laminated films are allowed to adhere to each other by means of fusion or with an adhesive in such a manner that the polyethylene film is disposed opposing to the wound electrode body 30.

A contact film 41 is inserted between the package member 40 and each of the positive electrode lead 31 and the negative electrode lead 32 for the purpose of preventing invasion of the outside air from occurring. This contact film 41 is constituted of a material having adhesion to each of the positive electrode lead 31 and the negative electrode lead 32. Examples of such a material include polyolefin resins such as polyethylene, polypropylene, modified polyethylene and modified polypropylene.

The package member 40 may also be constituted of a laminated film having other lamination structure, or constituted of a polymer film such as polypropylene or a metal film, in place of the foregoing aluminum laminated film.

FIG. 7 shows a sectional configuration along an I-I line of the wound electrode body 30 shown in FIG. 6. This wound electrode body 30 is one prepared by laminating a positive electrode 33 and a negative electrode 34 via a separator 35 and an electrolyte 36 and winding the laminate, and an outermost peripheral part thereof is protected by a protective tape 37.

The positive electrode 33 is, for example, one in which a positive electrode active material layer 33B is provided on the both surfaces of a positive electrode collector 33A.

The negative electrode 34 is, for example, one in which a negative electrode active material layer 34B is provided on the both surfaces of a negative electrode collector 34A, and a coating derived from at least one of the heteropolyacid salt compounds represented by the formulae (I) and (II) is formed on a negative electrode surface. In the formed coating, a deposit which is deposited by electrolysis of the heteropolyacid salt compound takes a three-dimensional structure, and when the nonaqueous electrolytic solution is contained in this structure within the battery system, a coating in a gel form containing an amorphous polyacid is formed. The positive electrode 33 and the negative electrode 34 are disposed in such a manner that the negative electrode active material layer 34B and the positive electrode active material layer 33B are opposed to each other. The configurations of the positive electrode collector 33A, the positive electrode active material layer 33B, the negative electrode collector 34A, the negative electrode active material layer 34B and the separator 35 are the same as those of the positive electrode collector 21A, the positive electrode active material layer 21B, the negative electrode collector 22A, the negative electrode active material layer 22B and the separator 23, respectively in the second embodiment.

The electrolyte 36 contains the electrolytic solution according to the first embodiment and a polymer compound capable of holding this electrolytic solution therein and is an electrolyte in a so-called gel form. The electrolyte in a gel form is preferable because not only a high ion conductivity (for example, 1 mS/cm or more at room temperature) is obtainable, but liquid leakage can be prevented from occurring.

(3-2) Manufacturing Method of Nonaqueous Electrolyte Battery

This nonaqueous electrolyte battery is, for example, manufactured by the following three kinds of manufacturing methods (first to third manufacturing methods).

(3-2-1) First Manufacturing Method

In a first manufacturing method, first of all, for example, the positive electrode active material layer 33B is formed on the both surfaces of the positive electrode collector 33A to fabricate the positive electrode 33, and the negative electrode active material layer 34B is formed on the both surfaces of the negative electrode collector 34A to fabricate the negative electrode 34, respectively, according to the same fabrication procedures of the positive electrode 21 and the negative electrode 22 according to the second embodiment.

Subsequently, a precursor solution containing the electrolytic solution according to the first embodiment a polymer compound and a solvent is prepared and coated on each of the positive electrode 33 and the negative electrode 34, and the solvent is then volatilized to form the electrolyte 36 in a gel form. Subsequently, the positive electrode lead 31 is installed in the positive electrode collector 33A, and the negative electrode lead 32 is also installed in the negative electrode collector 34A.

Subsequently, the positive electrode 33 and the negative electrode 34 each having the nonaqueous electrolyte layer 36 formed thereon are laminated via the separator 35, the laminate is wound in a longitudinal direction thereof, and thereafter, the protective tape 37 is allowed to adhere to an outermost peripheral part thereof, thereby fabricating the wound electrode body 30. Finally, for example, the wound electrode body 30 is interposed between the two package members 40 in a film form, and the outer edges of the package members 40 are allowed to adhere to each other by means of heat fusion or the like, thereby enclosing the wound electrode body 30 therein. On that occasion, the contact film 41 is inserted between each of the positive electrode lead 31 and the negative electrode lead 32 and the package member 40. There is thus completed the nonaqueous electrolyte battery.

(3-2-2) Second Manufacturing Method

In a second manufacturing method, first of all, the positive electrode lead 31 is installed in the positive electrode 33, and the negative electrode lead 32 is also installed in the negative electrode 34. Subsequently, the positive electrode 33 and the negative electrode 34 are laminated via the separator 35, the laminate is wound in a longitudinal direction thereof, and thereafter, the protective tape 37 is allowed to adhere to an outermost peripheral part thereof, thereby fabricating a wound body which is a precursor of the wound electrode body 30.

Subsequently, the wound body is interposed between the two package members 40 in a film form, and the outer edges exclusive of one side are allowed to adhere to each other by heat fusion or the like, thereby housing the wound body in the inside of the package member 40 in a bag form. Subsequently, am electrolyte composition containing the electrolytic solution according to the first embodiment a monomer as a raw material of a polymer compound, a polymerization initiator and optionally, other material such as a polymerization inhibitor is prepared and injected into the inside of the package member 40 in a bag form, and thereafter, an opening of the package member 40 is hermetically sealed by means of heat fusion or the like. Subsequently, the monomer is heat polymerized to prepare a polymer compound, thereby forming the electrolyte 36 in a gel form. There is thus completed the nonaqueous electrolyte battery.

(3-2-3) Third Manufacturing Method

In a third manufacturing method, first of all, a wound body is formed and housed in the inside of the package member 40 in a bag form in the same manner as in the foregoing second manufacturing method, except for using the separator 35 having a polymer compound coated on the both surfaces thereof.

Examples of the polymer compound which is coated on this separator 35 include polymers composed of, as a component, vinylidene fluoride, namely a homopolymer, a copolymer or a multi-component copolymer, or the like. Specific examples thereof include polyvinylidene fluoride; a binary copolymer composed of, as components, vinylidene fluoride and hexafluoropropylene; and a ternary copolymer composed of, as components, vinylidene fluoride, hexafluoropropylene and chlorotrifluoroethylene.

The polymer compound may contain one or two or more kinds of other polymer compounds together with the foregoing polymer composed of, as a component, vinylidene fluoride. Subsequently, the electrolytic solution according to the first embodiment is prepared and injected in the inside of the package material 40, and thereafter, an opening of the package member 40 is hermetically sealed by means of heat fusion or the like. Finally, the separator 35 is brought into intimate contact with each of the positive electrode 33 and the negative electrode 34 via the polymer compound upon heating while adding a weight to the package member 40. According to this, the electrolytic solution is impregnated into the polymer compound, and the polymer compound is gelled to form the electrolyte 36. There is thus completed the nonaqueous electrolyte battery.

When the nonaqueous electrolyte battery fabricated by any of the foregoing first to third manufacturing methods is preliminarily charged or charged, a coating derived from at least one of the heteropolyacid salt compounds represented by the formulae (I) and (II) is formed on the negative electrode surface.

<Effect>

In the third embodiment, the same effects as those in the second embodiment are brought.

4. Fourth Embodiment

A nonaqueous electrolyte battery according to a fourth embodiment is described. The nonaqueous electrolyte battery according to the fourth embodiment is a laminated film type nonaqueous electrolyte battery packaged by a laminated film and is the same as the nonaqueous electrolyte battery according to the third embodiment, except for using the electrolytic solution according to the first embodiment as it is. In consequence, the configuration thereof is hereunder described centering on points which are different from those in the third embodiment.

(4-1) Configuration of Nonaqueous Electrolyte Battery

In the nonaqueous electrolyte battery according to the fourth embodiment an electrolytic solution is used in place of the electrolyte 36 in a gel form. In consequence, the wound electrode body 30 has a configuration in which the electrolyte 36 is omitted, and the electrolytic solution is impregnated in the separator 35.

(4-2) Manufacturing Method of Nonaqueous Electrolyte Battery

This nonaqueous electrolyte battery is, for example, manufactured in the following manner.

First of all, for example, a positive electrode active material, a binder and a conductive agent are mixed to prepare a positive electrode mixture, and this positive electrode mixture is dispersed in a solvent such as N-methyl-2-pyrrolidone to prepare a positive electrode mixture slurry. Subsequently, this positive electrode mixture slurry is coated on the both surfaces of the positive electrode collector 33A and dried, and the resultant is then compression molded to form the positive electrode active material layer 33B. There is thus fabricated the positive electrode 33. Subsequently, for example, the positive electrode lead 31 is joined with the positive electrode collector 33A by means of, for example, ultrasonic welding, spot welding or the like.

Also, for example, a negative electrode material and a binder are mixed to prepare a negative electrode mixture, which is then dispersed in a solvent such as N-methyl-2-pyrrolidone to prepare a negative electrode mixture slurry. Subsequently, this negative electrode mixture slurry is coated on the both surfaces of the negative electrode collector 34A and dried, and the resultant is then compression molded to form the negative electrode active material layer 34B. There is thus fabricated the negative electrode 34. Subsequently, for example, the negative electrode lead 32 is joined with the negative electrode collector 34A by means of, for example, ultrasonic welding, spot welding or the like.

Subsequently, the positive electrode 33 and the negative electrode 34 are wound via the separator 35; the resultant is interposed into the package member 40; and thereafter, the electrolytic solution according to the first embodiment is injected, followed by hermetically sealing the package member 40. There is thus obtained the nonaqueous electrolyte battery shown in FIGS. 6 and 7.

<Effect>

In the fourth embodiment, the same effects as those in the second embodiment are obtained.

5. Fifth Embodiment

Figure 8:
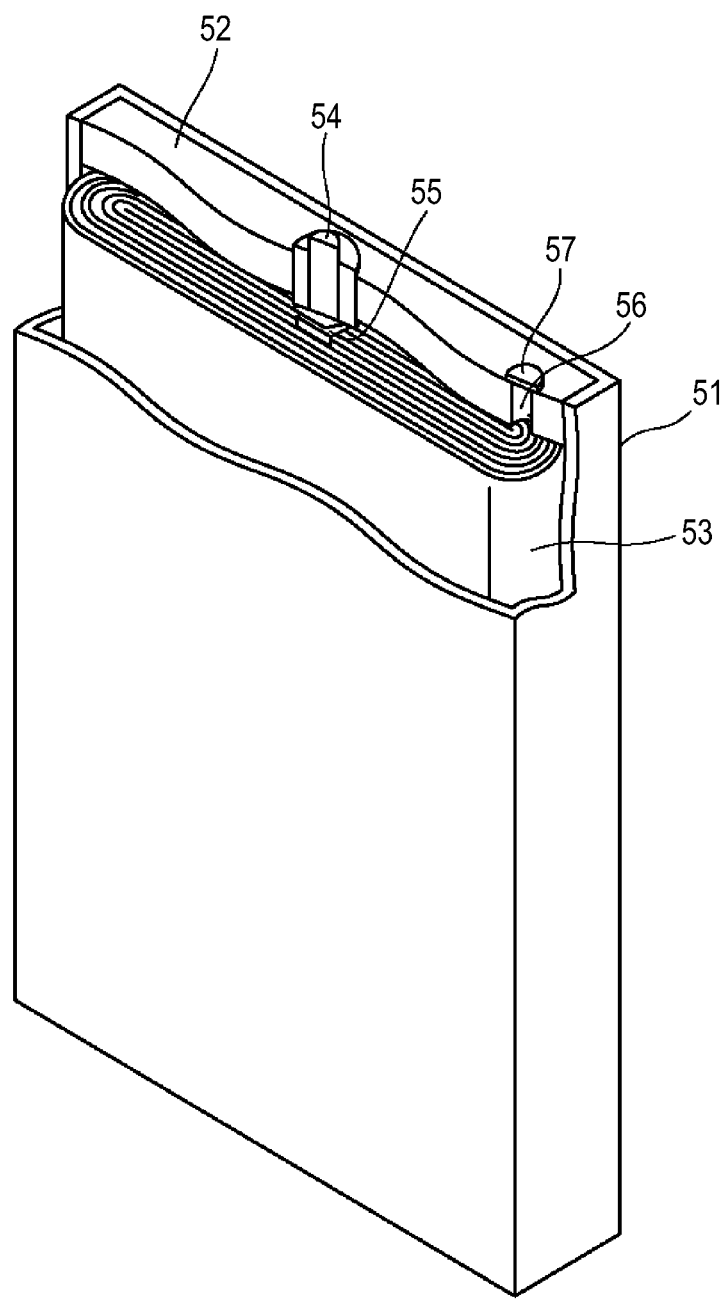
FIG. 8 is a sectional view showing other configuration example of a nonaqueous electrolyte battery according to an embodiment.

A configuration example of the nonaqueous electrolyte battery 20 according to a fifth embodiment is described. As shown in FIG. 8, the nonaqueous electrolyte battery 20 according to the fifth embodiment has a rectangular shape.

This aqueous electrolyte battery 20 is fabricated in the following manner. As shown in FIG. 8, first of all, a wound electrode body 53 is housed in a package can 51 which is a rectangular can made of a metal, for example, aluminum (Al), iron (Fe), etc.

Then, an electrode pin 54 provided on a battery lid 52 and an electrode terminal 55 led out from the wound electrode body 53 are connected to each other, followed by sealing by the battery lid 52. Thereafter, an electrolytic solution containing at least one of the heteropolyacid salt compounds represented by the formulae (I) and (II) is injected from an electrolytic solution injection port 56, followed by sealing by a sealing member 57. By charging or preliminarily charging the fabricated battery, the nonaqueous electrolyte battery 20 according to the fifth embodiment in which a compound derived from at least one of the heteropolyacid salt compounds represented by the formulae (I) and (II) is deposited on the surface of a negative electrode is completed.

The wound electrode body 53 is obtained by laminating a positive electrode and a negative electrode via a separator and winding the laminate. Since the positive electrode, the negative electrode, the separator and the electrolytic solution are the same as those in the first embodiment, their detailed descriptions are omitted.

<Effect>

According to the nonaqueous electrolyte battery 20 according to the fifth embodiment, the gas generation of the electrolytic solution can be suppressed, and breakage by an increase of the internal pressure to be caused due to the gas generation can be prevented from occurring.

6. Sixth Embodiment

A nonaqueous electrolyte battery according to a sixth embodiment is described. The nonaqueous electrolyte battery according to the sixth embodiment is a laminated film type nonaqueous electrolyte battery, in which an electrode body is formed by laminating a positive electrode and a negative electrode and packaged by a laminated film, and is the same as that according to the third embodiment except for the configuration of the electrode body. For that reason, only the electrode body according to the sixth embodiment is hereunder described.

[Positive Electrode and Negative Electrode]

Figure 9:
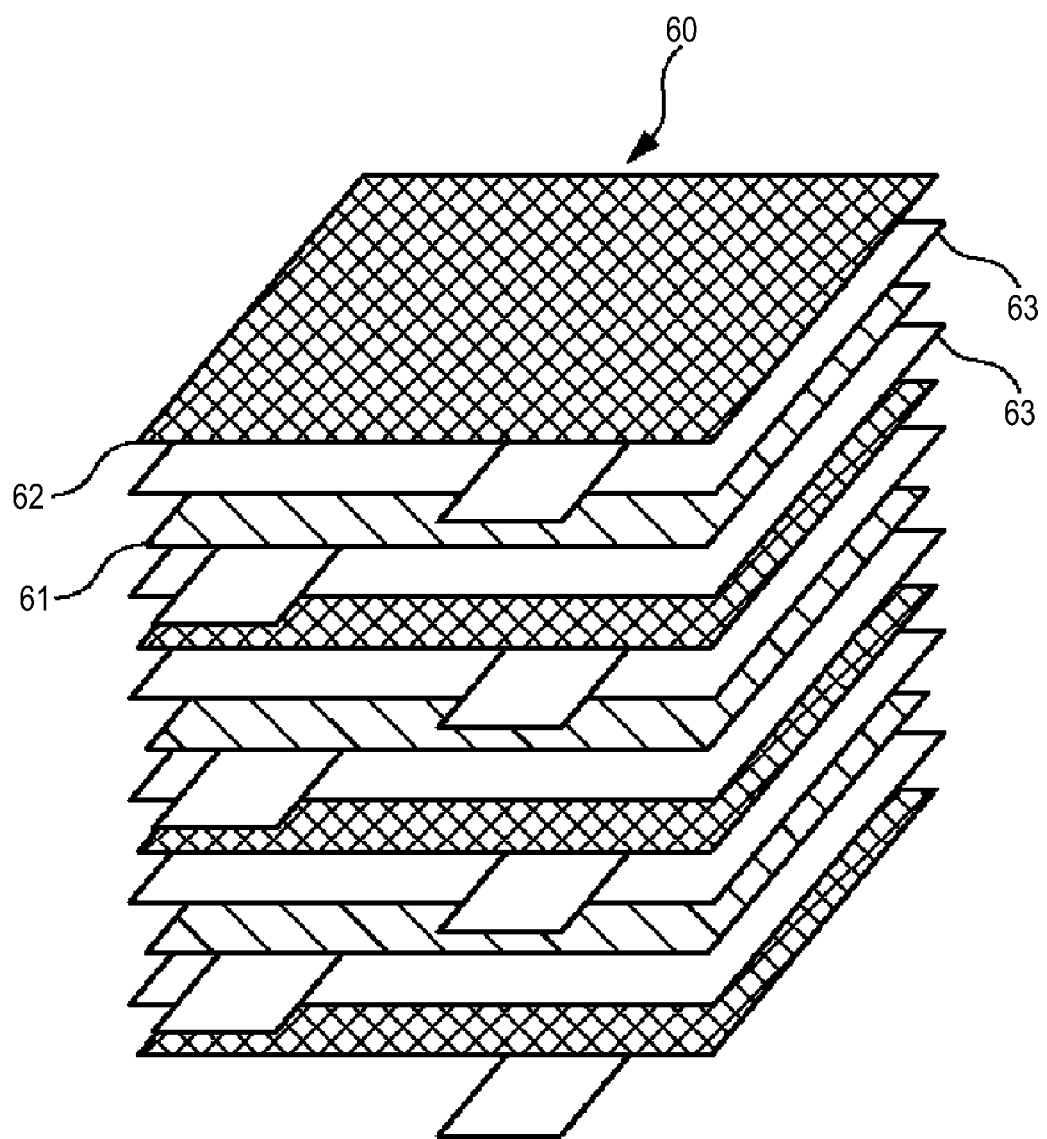
FIG. 9 is a schematic view showing other configuration example of a nonaqueous electrolyte battery according to an embodiment.

As shown in FIG. 9, a positive electrode 61 is obtained by forming a positive electrode active material layer on the both surfaces of a rectangular positive electrode collector. It is preferable that a positive electrode collector of the positive electrode 61 is formed integrally with a positive electrode terminal. Also, a negative electrode 62 is similarly made by forming a negative electrode active layer on a rectangular negative electrode collector.

The positive electrode 61 and the negative electrode 62 are laminated in the order of the positive electrode 61, a separator 63, the negative electrode 62 and a separator 63, thereby forming a laminated electrode body 60. In the laminated electrode body 60, the laminated state of electrodes may be kept by sticking an insulating tape or the like. The laminated electrode body 60 is packaged by a laminated film or the like and hermetically sealed in the battery together with a nonaqueous electrolytic solution. Also, a gel electrolyte may be used in place of the nonaqueous electrolytic solution.

EXAMPLES

The present embodiments specifically described below with reference to the following Examples, but it should not be construed that the embodiments are limited only to these Examples. In the following description, the mass of the heteropolyacid is defined to be a value obtained by subtracting the mass of bound water which the heteropolyacid has; and the mass of the heteropolyacid salt compound is defined to be a value obtained by subtracting the mass of bound water which the heteropolyacid salt compound has.

The heteropolyacids or heteropolyacid compounds used in the following Examples 1 and 2 are as follows.

Compound A: Lithium phosphotungstate having a Keggin structure

Compound B: Lithium silicotungstate having a Keggin structure

Compound C: Tetrabutylammonium silicotungstate having a Keggin structure

Compound D: Tetrabutylphosphonium silicotungstate having a Keggin structure

Compound E: Phosphotungstic acid heptahydrate having a Keggin structure

Compound F: Silicotungstic acid heptahydrate having a Keggin structure

Compound G: Phosphotungstic acid 30-hydrate having a Keggin structure

Compound H: Silicotungstic acid 30-hydrate having a Keggin structure

Example 1

In Example 1, characteristics of laminated film type batteries were evaluated by varying the kind of the heteropolyacid salt compound to be added.

Example 1-1

Fabrication of Positive Electrode 94 parts by mass of lithium cobaltate ($LiCoO_2$) as a positive electrode active material, 3 parts by mass of graphite as a conductive agent and 3 parts by mass of polyvinylidene fluoride (PVdF) as a binder were mixed, to which was then added N-methylpyrrolidone to obtain a positive electrode mixture slurry. Subsequently, this positive electrode mixture slurry was uniformly coated on the both surfaces of a 10 μm-thick aluminum (Al) foil serving as a positive electrode collector, and after drying, the resultant was compression molded by a roll press to form a positive electrode sheet in which a positive electrode active material layer having a volume density of 3.40 g/cc was formed. Finally, the positive electrode sheet was cut into a shape of 50 mm in width and 300 mm in length, and a positive electrode lead made of aluminum (Al) was installed in an end of the positive electrode collector by means of welding, thereby fabricating a positive electrode.

[Fabrication of Negative Electrode]

97 parts by mass of mesocarbon microbead (MCMB) as a negative electrode active material and 3 parts by mass of polyvinylidene fluoride (PVdF) as a binder were mixed, to which was then added N-methylpyrrolidone to obtain a negative electrode mixture slurry. Subsequently, this negative electrode mixture slurry was uniformly coated on the both surfaces of a 10 μm-thick copper foil serving as a negative electrode collector, and after drying, the resultant was compression molded by a roll press to form a negative electrode sheet in which a negative electrode active material layer having a volume density of 1.80 g/cc was formed. Finally, the negative electrode sheet was cut into a shape of 50 mm in width and 300 mm in length, and a negative electrode lead made of nickel (Ni) was installed in an end of the negative electrode collector by means of welding, thereby fabricating a negative electrode.

[Preparation of Nonaqueous Electrolytic Solution]

0.8 moles/kg of lithium hexafluorophosphate ($LiPF_6$) as an electrolyte salt and 1.0% by weight of Compound A as the heteropolyacid salt compound were dissolved in a mixed solution of ethylene carbonate (EC) and diethyl carbonate (DEC) in a mass ratio of 5/5.

The moisture content in the nonaqueous electrolytic solution as measured by the Karl Fischer's method was 18 ppm. Also, the acid content in the nonaqueous electrolytic solution as measured by the acid-base titration method was 80 ppm.

[Assembling of Battery]

The positive electrode, a separator made of a microporous polypropylene film having a thickness of 7 μm and the negative electrode were laminated in this order, the laminate was wound many times in a longitudinal direction thereof, and an end portion of winding was then fixed by an adhesive tape to form a flat type wound electrode body. The wound electrode body was housed in a bag-shaped package member made of an aluminum laminated film, and 2 g of the electrolytic solution was injected thereinto. Finally, an opening of the aluminum laminated film was sealed by heat fusion in a vacuum atmosphere. There was thus fabricated a cylindrical type battery of Example 1-1.

As a result of disassembling this battery after preliminary charge, it was confirmed that a coating in a gel form was formed on the negative electrode surface.

Example 1-2

A battery was fabricated in the same manner as in Example 1-1, except that a nonaqueous electrolytic solution in which Compound B was mixed as the heteropolyacid salt compound in place of Compound A was used. The moisture content and the acid content in the nonaqueous electrolytic solution as measured in the same manners as in Example 1-1 were 18 ppm and 82 ppm, respectively.

Example 1-3

A battery was fabricated in the same manner as in Example 1-1, except that a nonaqueous electrolytic solution in which Compound C was mixed as the heteropolyacid salt compound in place of Compound A was used. The moisture content and the acid content in the nonaqueous electrolytic solution as measured in the same manners as in Example 1-1 were 15 ppm and 58 ppm, respectively.

Example 1-4

A battery was fabricated in the same manner as in Example 1-1, except that a nonaqueous electrolytic solution in which Compound D was mixed as the heteropolyacid salt compound in place of Compound A was used. The moisture content and the acid content in the nonaqueous electrolytic solution as measured in the same manners as in Example 1-1 were 16 ppm and 63 ppm, respectively.

Comparative Example 1-1

A battery was fabricated in the same manner as in Example 1-1, except that a nonaqueous electrolytic solution in which Compound E was mixed as the heteropolyacid salt compound in place of Compound A was used. The moisture content and the acid content in the nonaqueous electrolytic solution as measured in the same manners as in Example 1-1 were 168 ppm and 721 ppm, respectively.

Comparative Example 1-2

A battery was fabricated in the same manner as in Example 1-1, except that a nonaqueous electrolytic solution in which Compound F was mixed as the heteropolyacid salt compound in place of Compound A was used. The moisture content and the acid content in the nonaqueous electrolytic solution as measured in the same manners as in Example 1-1 were 223 ppm and 582 ppm, respectively.

Comparative Example 1-3

A battery was fabricated in the same manner as in Example 1-1, except that a nonaqueous electrolytic solution in which Compound G was mixed as the heteropolyacid salt compound in place of Compound A was used. The moisture content and the acid content in the nonaqueous electrolytic solution as measured in the same manners as in Example 1-1 were 531 ppm and 2,120 ppm, respectively.

Comparative Example 1-4

A battery was fabricated in the same manner as in Example 1-1, except that a nonaqueous electrolytic solution in which Compound H was mixed as the heteropolyacid salt compound in place of Compound A was used. The moisture content and the acid content in the nonaqueous electrolytic solution as measured in the same manners as in Example 1-1 were 622 ppm and 2,064 ppm, respectively.

Comparative Example 1-5

A battery was fabricated in the same manner as in Example 1-1, except that a nonaqueous electrolytic solution in which 2.0% by weight of Compound E was mixed as the heteropolyacid salt compound in place of Compound A was used. In Comparative Example 1-5, a part of Compound E became insoluble, so that the moisture content and the acid content after dissolving the whole addition amount of the heteropolyacid salt compound could not be measured.

Comparative Example 1-6

A battery was fabricated in the same manner as in Example 1-1, except that a nonaqueous electrolytic solution in which 2.0% by weight of Compound F was mixed as the heteropolyacid salt compound in place of Compound A was used. In Comparative Example 1-6, a part of Compound F became insoluble, so that the moisture content and the acid content after dissolving the whole addition amount of the heteropolyacid salt compound could not be measured. Also, a part of the heteropolyacid structure of added Compound F collapsed.

Comparative Example 1-7

A battery was fabricated in the same manner as in Example 1-1, except that a nonaqueous electrolytic solution in which 2.0% by weight of Compound G was mixed as the heteropolyacid salt compound in place of Compound A. The moisture content and the acid content in the nonaqueous electrolytic solution as measured in the same manners as in Example 1-1 were 2,156 ppm and 3,590 ppm, respectively. Also, a part of the heteropolyacid structure of added Compound G collapsed.

Comparative Example 1-8

A battery was fabricated in the same manner as in Example 1-1, except that a nonaqueous electrolytic solution in which 2.0% by weight of Compound H was mixed as the heteropolyacid salt compound in place of Compound A. The moisture content and the acid content in the nonaqueous electrolytic solution as measured in the same manners as in Example 1-1 were 2,261 ppm and 3,356 ppm, respectively.

Comparative Example 1-9

A battery was fabricated in the same manner as in Example 1-1, except that a nonaqueous electrolytic solution in which no heteropolyacid was added. The moisture content and the acid content in the nonaqueous electrolytic solution as measured in the same manners as in Example 1-1 were 12 ppm and 56 ppm, respectively. As a result of disassembling this battery after preliminary charge, a deposit on the negative electrode surface could not be confirmed.

The batteries of Examples 1-1 to 1-4 and Comparative Examples 1-1 to 1-9 were subjected to the following initial capacity and cycle tests and high-rate discharge tests.

[Evaluation of Battery]

(a) Battery Blister Amount After Initial Charge

After measuring an initial battery thickness of each of the batteries of the foregoing Examples and Comparative Examples, constant-current charge was carried out at a constant current of 800 mA in an environment at 23° C. until a voltage reached 4.2 V, and the charge was continued at a constant voltage of 4.2 V until a total charge time reached 3 hours. Thereafter, a battery thickness after the initial charge was measured. In order to show a battery blister amount, a change rate in battery thickness after initial charge was calculated according to the following expression.

Change rate in battery thickness after initial charge [%]={(Battery thickness after initial charge)/(Initial battery thickness)}×100

(b) Battery Blister Amount After High-Temperature Storage:

With respect to each of the batteries of the foregoing Examples and Comparative Examples, constant-current charge was carried out a constant current of 800 mA in an environment at 23° C. until a voltage reached 4.2 V, and the charge was continued at a constant voltage of 4.2 V until a total charge time reached 3 hours. Thereafter, a battery thickness after initial charge was measured.

Subsequently, the battery in a charged state was stored in a thermostat at 85° C. for 12 hours, and thereafter, a battery thickness after high-temperature storage was measured. In order to show a battery blister amount, a change rate in battery thickness after high-temperature storage was calculated according to the following expression.

Change rate in battery thickness after high-temperature storage [%]={(Battery thickness after high-temperature storage)/(Battery thickness after initial charge)}×100

The test results are shown in the following Table 1.

It is noted from Table 1 that in the batteries using an electrolytic solution containing each of Compounds A to D as the heteropolyacid salt compound according to the embodiments the battery blister at the time of initial charge and also after high-temperature storage is suppressed. It may be considered that an increase in the battery thickness correlates with the moisture content and the acid content in the electrolytic solution; and that the moisture and protons which the heteropolyacid contains in a structure thereof vigorously react with the electrode to cause decomposition at the time of charge, so that the battery thickness is increased, and deterioration of the battery characteristics is caused.

It is effective for improving the battery characteristics to remove crystal water from the structure of the heteropolyacid. However, when crystal water is removed from the proton-containing heteropolyacid, a part of the structure is hardly kept, the solubility in the electrolytic solution becomes worse, and the desired effects are hardly obtainable. In the heteropolyacid salt compound according to the embodiments since the cation exchanged with the proton stabilizes the structure of the heteropolyacid, the high-temperature storage characteristic can be improved without increasing each of the moisture content and the acid content.

Example 2

In Example 2, characteristics of laminated film type batteries were evaluated by varying the addition amount of each of Compounds A to D as the heteropolyacid salt compound.

Example 2-1

A battery was fabricated in the same manner as in Example 1-1, except that a nonaqueous electrolytic solution in which 0.01% by weight of Compound A as the heteropolyacid salt compound was mixed was used. The moisture content and the acid content in the nonaqueous electrolytic solution as measured in the same manners as in Example 1-1 were 12 ppm and 58 ppm, respectively.

TABLE 1

| | Composition of electrolytic solution | Heteropolyacid compound Kind | Mixing amount [% by weight] | Moisture content [ppm] | Acid content [ppm] | Change rate in battery thickness after initial charge [%] | Change rate in battery thickness after high-temperature storage [%] |
|---|---|---|---|---|---|---|---|
| Example 1-1 | EC + DEC | Compound A | 1.0 | 18 | 80 | 10.9 | 9.8 |
| Example 1-2 | LiPF$_6$ | Compound B | | 18 | 82 | 11.0 | 8.7 |
| Example 1-3 | (0.8 moles/kg) | Compound C | | 15 | 58 | 12.1 | 10.4 |
| Example 1-4 | | Compound D | | 16 | 63 | 11.5 | 10.1 |
| Comparative Example 1-1 | | Compound E | | 168 | 721 | 14.2 | 21.8 |
| Comparative Example 1-2 | | Compound F | | 223 | 582 | 14.7 | 20.4 |
| Comparative Example 1-3 | | Compound G | | 531 | 2120 | 18.6 | 26.3 |
| Comparative Example 1-4 | | Compound H | | 622 | 2064 | 18.9 | 24.6 |
| Comparative Example 1-5 | | Compound E | 2.0 | | | Partially insoluble | |
| Comparative Example 1-6 | | Compound F | | | | Partially insoluble | |
| Comparative Example 1-7 | | Compound G | | 2156 | 3590 | 22.4 | 13.1 |
| Comparative Example 1-8 | | Compound H | | 2261 | 3356 | 24.8 | 12.3 |
| Comparative Example 1-9 | | — | — | 12 | 56 | 11.2 | 32.5 |

Example 2-2

A battery was fabricated in the same manner as in Example 2-1, except that a nonaqueous electrolytic solution in which 0.05% by weight of Compound A as the heteropolyacid salt compound was mixed was used. The moisture content and the acid content in the nonaqueous electrolytic solution as measured in the same manners as in Example 1-1 were 12 ppm and 58 ppm, respectively.

Example 2-3

A battery was fabricated in the same manner as in Example 2-1, except that a nonaqueous electrolytic solution in which 0.1% by weight of Compound A as the heteropolyacid salt compound was mixed was used. The moisture content and the acid content in the nonaqueous electrolytic solution as measured in the same manners as in Example 1-1 were 15 ppm and 65 ppm, respectively.

Example 2-4

A battery was fabricated in the same manner as in Example 2-1, except that a nonaqueous electrolytic solution in which 0.5% by weight of Compound A as the heteropolyacid salt compound was mixed was used. The moisture content and the acid content in the nonaqueous electrolytic solution as measured in the same manners as in Example 1-1 were 16 ppm and 73 ppm, respectively.

Example 2-5

A battery was fabricated in the same manner as in Example 2-1, except that a nonaqueous electrolytic solution in which 1.0% by weight of Compound A as the heteropolyacid salt compound was mixed was used. The moisture content and the acid content in the nonaqueous electrolytic solution as measured in the same manners as in Example 1-1 were 18 ppm and 80 ppm, respectively.

Example 2-6

A battery was fabricated in the same manner as in Example 2-1, except that a nonaqueous electrolytic solution in which 2.0% by weight of Compound A as the heteropolyacid salt compound was mixed was used. The moisture content and the acid content in the nonaqueous electrolytic solution as measured in the same manners as in Example 1-1 were 21 ppm and 84 ppm, respectively.

Example 2-7

A battery was fabricated in the same manner as in Example 2-1, except that a nonaqueous electrolytic solution in which 3.0% by weight of Compound A as the heteropolyacid salt compound was mixed was used. The moisture content and the acid content in the nonaqueous electrolytic solution as measured in the same manners as in Example 1-1 were 31 ppm and 91 ppm, respectively.

Example 2-8

A battery was fabricated in the same manner as in Example 2-1, except that a nonaqueous electrolytic solution in which 5.0% by weight of Compound A as the heteropolyacid salt compound was mixed was used. The moisture content and the acid content in the nonaqueous electrolytic solution as measured in the same manners as in Example 1-1 were 43 ppm and 98 ppm, respectively.

Example 2-9

A battery was fabricated in the same manner as in Example 1-1, except that a nonaqueous electrolytic solution in which 0.01% by weight of Compound B as the heteropolyacid salt compound was mixed was used. The moisture content and the acid content in the nonaqueous electrolytic solution as measured in the same manners as in Example 1-1 were 12 ppm and 58 ppm, respectively.

Example 2-10

A battery was fabricated in the same manner as in Example 2-1, except that a nonaqueous electrolytic solution in which 0.05% by weight of Compound B as the heteropolyacid salt compound was mixed was used. The moisture content and the acid content in the nonaqueous electrolytic solution as measured in the same manners as in Example 1-1 were 12 ppm and 58 ppm, respectively.

Example 2-11

A battery was fabricated in the same manner as in Example 2-1, except that a nonaqueous electrolytic solution in which 0.1% by weight of Compound B as the heteropolyacid salt compound was mixed was used. The moisture content and the acid content in the nonaqueous electrolytic solution as measured in the same manners as in Example 1-1 were 15 ppm and 66 ppm, respectively.

Example 2-12

A battery was fabricated in the same manner as in Example 2-1, except that a nonaqueous electrolytic solution in which 0.5% by weight of Compound B as the heteropolyacid salt compound was mixed was used. The moisture content and the acid content in the nonaqueous electrolytic solution as measured in the same manners as in Example 1-1 were 16 ppm and 78 ppm, respectively.

Example 2-13

A battery was fabricated in the same manner as in Example 2-1, except that a nonaqueous electrolytic solution in which 1.0% by weight of Compound B as the heteropolyacid salt compound was mixed was used. The moisture content and the acid content in the nonaqueous electrolytic solution as measured in the same manners as in Example 1-1 were 18 ppm and 82 ppm, respectively.

Example 2-14

A battery was fabricated in the same manner as in Example 2-1, except that a nonaqueous electrolytic solution in which 2.0% by weight of Compound B as the heteropolyacid salt compound was mixed was used. The moisture content and the acid content in the nonaqueous electrolytic solution as measured in the same manners as in Example 1-1 were 22 ppm and 95 ppm, respectively.

Example 2-15

A battery was fabricated in the same manner as in Example 2-1, except that a nonaqueous electrolytic solution in which 3.0% by weight of Compound B as the heteropolyacid salt compound was mixed was used. The moisture content and the acid content in the nonaqueous electrolytic solution as measured in the same manners as in Example 1-1 were 30 ppm and 98 ppm, respectively.

Example 2-16

A battery was fabricated in the same manner as in Example 2-1, except that a nonaqueous electrolytic solution in which 5.0% by weight of Compound B as the heteropolyacid salt compound was mixed was used. The moisture content and the acid content in the nonaqueous electrolytic solution as measured in the same manners as in Example 1-1 were 43 ppm and 103 ppm, respectively.

Example 2-17

A battery was fabricated in the same manner as in Example 1-1, except that a nonaqueous electrolytic solution in which 0.01% by weight of Compound C as the heteropolyacid salt compound was mixed was used. The moisture content and the acid content in the nonaqueous electrolytic solution as measured in the same manners as in Example 1-1 were 12 ppm and 56 ppm, respectively.

Example 2-18

A battery was fabricated in the same manner as in Example 2-1, except that a nonaqueous electrolytic solution in which 0.05% by weight of Compound C as the heteropolyacid salt compound was mixed was used. The moisture content and the acid content in the nonaqueous electrolytic solution as measured in the same manners as in Example 1-1 were 12 ppm and 56 ppm, respectively.

Example 2-19

A battery was fabricated in the same manner as in Example 2-1, except that a nonaqueous electrolytic solution in which 0.1% by weight of Compound C as the heteropolyacid salt compound was mixed was used. The moisture content and the acid content in the nonaqueous electrolytic solution as measured in the same manners as in Example 1-1 were 12 ppm and 56 ppm, respectively.

Example 2-20

A battery was fabricated in the same manner as in Example 2-1, except that a nonaqueous electrolytic solution in which 0.5% by weight of Compound C as the heteropolyacid salt compound was mixed was used. The moisture content and the acid content in the nonaqueous electrolytic solution as measured in the same manners as in Example 1-1 were 14 ppm and 57 ppm, respectively.

Example 2-21

A battery was fabricated in the same manner as in Example 2-1, except that a nonaqueous electrolytic solution in which 1.0% by weight of Compound C as the heteropolyacid salt compound was mixed was used. The moisture content and the acid content in the nonaqueous electrolytic solution as measured in the same manners as in Example 1-1 were 15 ppm and 58 ppm, respectively.

Example 2-22

A battery was fabricated in the same manner as in Example 2-1, except that a nonaqueous electrolytic solution in which 2.0% by weight of Compound C as the heteropolyacid salt compound was mixed was used. The moisture content and the acid content in the nonaqueous electrolytic solution as measured in the same manners as in Example 1-1 were 16 ppm and 61 ppm, respectively.

Example 2-23

A battery was fabricated in the same manner as in Example 2-1, except that a nonaqueous electrolytic solution in which 3.0% by weight of Compound C as the heteropolyacid salt compound was mixed was used. The moisture content and the acid content in the nonaqueous electrolytic solution as measured in the same manners as in Example 1-1 were 20 ppm and 61 ppm, respectively.

Example 2-24

A battery was fabricated in the same manner as in Example 2-1, except that a nonaqueous electrolytic solution in which 5.0% by weight of Compound C as the heteropolyacid salt compound was mixed was used. The moisture content and the acid content in the nonaqueous electrolytic solution as measured in the same manners as in Example 1-1 were 22 ppm and 62 ppm, respectively.

Example 2-25

A battery was fabricated in the same manner as in Example 2-1, except that a nonaqueous electrolytic solution prepared by dissolving 1.0% by weight of fluoroethylene carbonate (FEC), 0.8 moles/kg of lithium hexafluorophosphate ($LiPF_6$) as an electrolyte salt and 1.0% by weight of Compound A as a heteropolyacid salt compound in a mixed solution of ethylene carbonate (EC) and diethyl carbonate (DEC) in a mass ratio of 5/5 was used. The moisture content and the acid content in the nonaqueous electrolytic solution as measured in the same manners as in Example 1-1 were 18 ppm and 82 ppm, respectively.

Example 2-26

A battery was fabricated in the same manner as in Example 2-25, except that a nonaqueous electrolytic solution in which Compound B was mixed as the heteropolyacid salt compound in place of Compound A. The moisture content and the acid content in the nonaqueous electrolytic solution as measured in the same manners as in Example 1-1 were 18 ppm and 83 ppm, respectively.

Example 2-27

A battery was fabricated in the same manner as in Example 2-25, except that a nonaqueous electrolytic solution in which Compound C was mixed as the heteropolyacid salt compound in place of Compound A. The moisture content and the acid content in the nonaqueous electrolytic solution as measured in the same manners as in Example 1-1 were 16 ppm and 59 ppm, respectively.

Example 2-28

A battery was fabricated in the same manner as in Example 2-25, except that a nonaqueous electrolytic solution in which Compound D was mixed as the heteropolyacid salt compound in place of Compound A. The moisture content and the acid content in the nonaqueous electrolytic solution as measured in the same manners as in Example 1-1 were 18 ppm and 71 ppm, respectively.

Example 2-29

A battery was fabricated in the same manner as in Example 2-25, except that vinylene carbonate (VC) was added in place of fluoroethylene carbonate (FEC). The moisture content and the acid content in the nonaqueous electrolytic solution as measured in the same manners as in Example 1-1 were 18 ppm and 81 ppm, respectively.

Example 2-30

A battery was fabricated in the same manner as in Example 2-29, except that Compound B was mixed as the heteropolyacid salt compound in place of Compound A. The moisture content and the acid content in the nonaqueous electrolytic solution as measured in the same manners as in Example 1-1 were 18 ppm and 82 ppm, respectively.

Example 2-31

A battery was fabricated in the same manner as in Example 2-29, except that Compound C was mixed as the heteropolyacid salt compound in place of Compound A. The moisture content and the acid content in the nonaqueous electrolytic solution as measured in the same manners as in Example 1-1 were 18 ppm and 58 ppm, respectively.

Example 2-32

A battery was fabricated in the same manner as in Example 2-29, except that Compound D was mixed as the heteropolyacid salt compound in place of Compound A. The moisture content and the acid content in the nonaqueous electrolytic solution as measured in the same manners as in Example 1-1 were 17 ppm and 66 ppm, respectively.

[Evaluation of Battery]
(a) Battery blister amount after initial charge
(b) Battery blister amount after high-temperature storage A change rate in battery thickness after each of initial charge and high-temperature storage was calculated in the same manner as in Example 1.

The test results are shown in the following Tables 2 and 3.

TABLE 2

| | Composition of electrolytic solution | Heteropolyacid compound Kind | Heteropolyacid compound Mixing amount [% by weight] | Moisture content [ppm] | Acid content [ppm] | Change rate in battery thickness after initial charge [%] | Change rate in battery thickness after high-temperature storage [%] |
|---|---|---|---|---|---|---|---|
| Example 2-1 | EC + DEC | Compound A | 0.01 | 12 | 58 | 11.2 | 21.3 |
| Example 2-2 | $LiPF_6$ | | 0.05 | 12 | 58 | 11.1 | 18.1 |
| Example 2-3 | (0.8 moles/kg) | | 0.1 | 15 | 65 | 11.2 | 15.6 |
| Example 2-4 | | | 0.5 | 16 | 73 | 11.0 | 13.7 |
| Example 2-5 | | | 1.0 | 18 | 80 | 10.9 | 9.8 |
| Example 2-6 | | | 2.0 | 21 | 84 | 11.0 | 6.4 |
| Example 2-7 | | | 3.0 | 31 | 91 | 11.6 | 6.3 |
| Example 2-8 | | | 5.0 | 43 | 98 | 12.3 | 7.0 |
| Example 2-9 | | Compound B | 0.01 | 12 | 58 | 11.2 | 19.8 |
| Example 2-10 | | | 0.05 | 12 | 58 | 11.2 | 17.8 |
| Example 2-11 | | | 0.1 | 15 | 66 | 11.2 | 14.9 |
| Example 2-12 | | | 0.5 | 16 | 78 | 11.2 | 11.4 |
| Example 2-13 | | | 1.0 | 18 | 82 | 11.0 | 8.7 |
| Example 2-14 | | | 2.0 | 22 | 95 | 11.1 | 8.2 |
| Example 2-15 | | | 3.0 | 30 | 98 | 11.8 | 8.1 |
| Example 2-16 | | | 5.0 | 43 | 103 | 12.5 | 8.6 |
| Example 2-17 | | Compound C | 0.01 | 12 | 56 | 11.2 | 22.4 |
| Example 2-18 | | | 0.05 | 12 | 56 | 11.3 | 19.3 |
| Example 2-19 | | | 0.1 | 12 | 56 | 11.6 | 16.4 |
| Example 2-20 | | | 0.5 | 14 | 57 | 11.8 | 14.5 |
| Example 2-21 | | | 1.0 | 15 | 58 | 12.1 | 10.4 |
| Example 2-22 | | | 2.0 | 16 | 61 | 12.6 | 10.1 |
| Example 2-23 | | | 3.0 | 20 | 61 | 13.7 | 9.5 |
| Example 2-24 | | | 5.0 | 22 | 62 | 13.9 | 9.1 |

TABLE 3

| | Composition of electrolytic solution | Heteropolyacid compound Kind | Heteropolyacid compound Mixing amount [% by weight] | Moisture content [ppm] | Acid content [ppm] | Change rate in battery thickness after initial charge [%] | Change rate in battery thickness after high-temperature storage [%] |
|---|---|---|---|---|---|---|---|
| Example 2-25 | EC + DEC + FEC | Compound A | 1.0 | 18 | 82 | 0.92 | 9.9 |
| Example 2-26 | $LiPF_6$ | Compound B | | 18 | 83 | 0.92 | 9.2 |
| Example 2-27 | (0.8 moles/kg) | Compound C | | 16 | 59 | 0.94 | 10.6 |
| Example 2-28 | | Compound D | | 18 | 71 | 0.92 | 10.2 |
| Example 2-29 | EC + DEC + VC | Compound A | 1.0 | 18 | 81 | 0.95 | 9.8 |
| Example 2-30 | $LiPF_6$ | Compound B | | 18 | 82 | 0.93 | 8.8 |
| Example 2-31 | (0.8 moles/kg) | Compound C | | 18 | 58 | 0.97 | 10.5 |
| Example 2-32 | | Compound D | | 17 | 66 | 0.95 | 10.2 |

It is noted from Table 2 that by using the heteropolyacid salt compound according to the embodiments deterioration of the electrolytic solution can be suppressed over a wide addition amount range, thereby suppressing the cell blister from the initial charge to after the high-temperature storage. In particular, from the viewpoint of battery blister after the initial charge, the addition amount of the heteropolyacid salt compound is preferably 0.01% by weight or more and not more than 3.0% by weight. Also, on review including the viewpoint of battery blister after the high-temperature storage, the addition amount of the heteropolyacid salt compound is preferably 1.0% by weight or more and not more than 3.0% by weight.

The lithium salt of a heteropolyacid is preferable as the heteropolyacid salt compound. In the ammonium salt, though the stability of an ammonium cation against the charge/discharge is slightly inferior to that of a lithium ion, the effect for suppressing the increase of each of the moisture content and the acid content is high even in a high addition amount. As to the anion segment of the heteropolyacid, silicotungstic acid is preferable from the standpoint of characteristics at the time of high-temperature storage. It may be considered that this is caused due to the fact that the coating produced from the silicon-containing heteropolyacid salt compound is electrochemically stable.

Also, it is noted from Table 3 that when fluoroethylene carbonate and vinylene carbonate, both of which are the reactive cyclic carbonate, are used jointly, the cell blister can be more effectively suppressed from the time of initial charge.

Example 3

Confirmation of Effects of Heteropolyacid Having Each of a Keggin Structure and a Preyssler Structure The heteropolyacids or heteropolyacid compounds used in the following samples are as follows.

Compound I: Lithium phosphotungstate having a Preyssler structure

Compound J: Potassium phosphotungstate having a Preyssler structure

Compound K: Phosphotungstic acid 44-hydrate having a Preyssler structure

Compound L: Phosphotungstic acid 30-hydrate having a Keggin structure

In the following description, the mass of the heteropolyacid is defined to be a value obtained by subtracting the mass of bound water which the heteropolyacid has; and the mass of the heteropolyacid salt compound is defined to be a value obtained by subtracting the mass of bound water which the heteropolyacid salt compound has.

Example 3-1

Fabrication of Positive Electrode 94 parts by mass of lithium cobaltate ($LiCoO_2$) as a positive electrode active material, 3 parts by mass of graphite as a conductive agent and 3 parts by mass of polyvinylidene fluoride (PVdF) as a binder were mixed, to which was then added N-methylpyrrolidone to obtain a positive electrode mixture slurry. Subsequently, this positive electrode mixture slurry was uniformly coated on the both surfaces of a 10 μm-thick aluminum (Al) foil serving as a positive electrode collector, and after drying, the resultant was compression molded by a roll press to form a positive electrode sheet in which a positive electrode active material layer having a volume density of 3.40 g/cc was formed. Finally, the positive electrode sheet was cut into a shape of 50 mm in width and 300 mm in length, and a positive electrode lead made of aluminum (Al) was installed in an end of the positive electrode collector by means of welding, thereby fabricating a positive electrode.

[Fabrication of Negative Electrode]

97 parts by mass of mesocarbon microbead (MCMB) as a negative electrode active material and 3 parts by mass of polyvinylidene fluoride (PVdF) as a binder were mixed, to which was then added N-methylpyrrolidone to obtain a negative electrode mixture slurry. Subsequently, this negative electrode mixture slurry was uniformly coated on the both surfaces of a 10 μm-thick copper foil serving as a negative electrode collector, and after drying, the resultant was compression molded by a roll press to form a negative electrode sheet in which a negative electrode active material layer having a volume density of 1.80 g/cc was formed. Finally, the negative electrode sheet was cut into a shape of 50 mm in width and 300 mm in length, and a negative electrode lead made of nickel (Ni) was installed in an end of the negative electrode collector by means of welding, thereby fabricating a negative electrode.

[Preparation of Nonaqueous Electrolytic Solution]

0.8 moles/kg of lithium hexafluorophosphate ($LiPF_6$) as an electrolyte salt and 1.0% by weight of Compound I as the heteropolyacid salt compound were dissolved in a mixed solution of ethylene carbonate (EC) and diethyl carbonate (DEC) in a mass ratio of 5/5.

[Assembling of Battery]

A separator prepared by coating polyvinylidene fluoride in a thickness of 2 μm on each surface of a microporous polypropylene film having a thickness of 7 μm was used. The positive electrode and the negative electrode were laminated via the separator, the laminate was wound many times in a longitudinal direction thereof, and thereafter, an end portion of winding was fixed by an adhesive tape to form a flat type wound electrode body. Subsequently, the wound electrode body was housed in a bag-shaped package member made of an aluminum laminated film, and 2 g of the electrolytic solution was injected thereinto. Subsequently, an opening of the aluminum laminated film was sealed by heat fusion in a vacuum atmosphere. Thereafter, the resultant was heated while applying a pressure from the outside, thereby fabricating a laminated film type test secondary battery in which a gel electrolyte layer was formed.

As a result of disassembling this battery after preliminary charge, it was confirmed that a coating in a gel form was formed on the negative electrode surface. Also, the moisture content and the acid content in the nonaqueous electrolytic solution as measured in the same manners as in Example 1-1 were 15 ppm and 65 ppm, respectively.

Example 3-2

A battery was fabricated in the same manner as in Example 3-1, except that a nonaqueous electrolytic solution in which Compound J was mixed as the heteropolyacid compound in place of Compound I was used. The moisture content and the acid content in the nonaqueous electrolytic solution as measured in the same manners as in Example 1-1 were 15 ppm and 62 ppm, respectively.

Examples 3-3 to 3-4

Test secondary batteries were fabricated in the same manners as in Examples 3-1 to 3-2, except that the addition amount of the heteropolyacid compound relative to the non-aqueous electrolytic solution was regulated to 2.0% by weight. The moisture content and the acid content in the nonaqueous electrolytic solution as measured in the same manners as in Example 1-1 were 20 ppm and 74 ppm, respectively in Example 3-3 and 18 ppm and 70 ppm, respectively in Example 3-4.

Comparative Examples 3-1 to 3-2

Test secondary batteries were fabricated in the same manners as in Examples 3-1 to 3-2, except that Compounds I and J as the heteropolyacid compounds were replaced by Compounds K and L as the heteropolyacid compound, respectively. The moisture content and the acid content in the nonaqueous electrolytic solution as measured in the same manners as in Example 1-1 were 483 ppm and 1,955 ppm, respectively in Comparative Example 3-1 and 531 ppm and 2,120 ppm, respectively in Comparative Example 3-2.

Comparative Examples 3-3 to 3-4

Test secondary batteries were fabricated in the same manners as in Examples 3-1 to 3-2, except that Compounds I and J as the heteropolyacid compounds were replaced by Compounds K and L as the heteropolyacid compound, respectively; and that the addition amount of each of the heteropolyacid compounds was regulated to 2.0% by weight. The moisture content and the acid content in the nonaqueous electrolytic solution as measured in the same manners as in Example 1-1 were 1,918 ppm and 3,213 ppm, respectively in Comparative Example 3-3 and 2,156 ppm and 3,590 ppm, respectively in Comparative Example 3-4.

Comparative Example 3-5

A test secondary battery was fabricated in the same manner as in Example 3-1, except that the heteropolyacid compound or heteropolyacid was not added to the nonaqueous electrolytic solution. The moisture content and the acid content in the nonaqueous electrolytic solution as measured in the same manners as in Example 1-1 were 12 ppm and 56 ppm, respectively.

[Evaluation of Battery]
(a) Battery blister amount after initial charge
(b) Battery blister amount after high-temperature storage A change rate in battery thickness after each of initial charge and high-temperature storage was calculated in the same manner as in Example 1.

The test results are shown in the following Table 4.

As is clear from Table 4, as compared with Comparative Example 3-5 in which the heteropolyacid or heteropolyacid compound is not added, in Examples 3-1 to 3-4 using Compound I or Compound J which is a heteropolyacid compound having a Preyssler structure, the battery blister after each of the initial charge and the high-temperature storage could be suppressed.

On the other hand, in Comparative Examples 3-1 to 3-4 using Compound K or Compound L which is a salt-free heteropolyacid having a Preyssler structure or Keggin structure, though the battery blister at the time of high-temperature storage is suppressed, the battery blister at the time of initial charge increases.

It may be considered from Table 4 that an increase in the battery thickness correlates with each of the moisture content and the acid content in the electrolytic solution; and that the moisture and protons which the heteropolyacid contains in a structure thereof vigorously react with the electrode to cause decomposition at the time of charge, so that the cell thickness is increased, and deterioration of the battery characteristics is caused. It is effective for improving the battery characteristics to remove crystal water from the structure of a heteropolyacid. However, when crystal water is removed from a proton-containing heteropolyacid, a part of the structure is hardly kept, the solubility in the electrolytic solution becomes worse, and the desired effects are hardly obtainable.

The heteropolyacid compound is able to suppress the battery blister from the time of initial charge to the time of high-temperature storage. In particular, since the heteropolyacid compound having a Preyssler structure has an anion in which the anion of a Keggin structure is further condensed and is stable against a pH change during the cation exchange, it is able to improve the high-temperature storage characteristic without increasing each of the moisture content and the acid content.

Also, by regulating the addition amount of the heteropolyacid or heteropolyacid compound to 2.0% by weight, a higher blister-suppressing effect could be obtained.

Example 4

Confirmation of Effects of Heteropolyacid Having Each of a Keggin Structure and a Preyssler Structure The heteropolyacids or heteropolyacid compounds used in the following samples are the same as those in Example 3.

TABLE 4

|  | Composition of electrolytic solution | Heteropolyacid compound | | Moisture content [ppm] | Acid content [ppm] | Change rate in battery thickness after initial charge [%] | Change rate in battery thickness after high-temperature storage [%] |
| --- | --- | --- | --- | --- | --- | --- | --- |
|  |  | Kind | Mixing amount [% by weight] | | | | |
| Example 3-1 | EC + DEC | Compound I | 1.0 | 15 | 65 | 10.5 | 9.7 |
| Example 3-2 | LiPF$_6$ | Compound J |  | 15 | 62 | 10.7 | 11.4 |
| Example 3-3 | (0.8 moles/kg) | Compound I | 2.0 | 20 | 74 | 10.6 | 6.4 |
| Example 3-4 |  | Compound J |  | 18 | 70 | 10.8 | 8.5 |
| Comparative Example 3-1 |  | Compound K | 1.0 | 483 | 1955 | 15.1 | 22.9 |
| Comparative Example 3-2 |  | Compound L |  | 531 | 2120 | 18.6 | 26.3 |
| Comparative Example 3-3 |  | Compound K | 2.0 | 1918 | 3213 | 18.2 | 11.8 |
| Comparative Example 3-4 |  | Compound L |  | 2156 | 3590 | 22.4 | 13.1 |
| Comparative Example 3-5 |  | — | — | 12 | 56 | 11.2 | 32.5 |

Examples 4-1 to 4-8

Test secondary batteries were fabricated in the same manner as in Example 3-1, except that the addition amount of Compound I as the heteropolyacid was varied as shown in Table 5.

Examples 4-9 to 4-16

Test secondary batteries were fabricated in the same manner as in Example 3-1, except that Compound J was used as the heteropolyacid; and that the addition amount of Compound J was varied as shown in Table 5.

Examples 4-17 to 4-18

Test secondary batteries were fabricated in the same manners as in Examples 3-1 to 3-2, except that 1% by weight of fluoroethylene carbonate (FEC) was added to the nonaqueous electrolytic solution.

Examples 4-19 to 4-20

Test secondary batteries were fabricated in the same manners as in Examples 3-1 to 3-2, except that 1% by weight of vinylene carbonate (VC) was added to the nonaqueous electrolytic solution.

Comparative Examples 4-1 to 4-2

Test secondary batteries were fabricated in the same manners as in Comparative Examples 3-1 to 3-2, except that 1% by weight of fluoroethylene carbonate (FEC) was added to the nonaqueous electrolytic solution.

Comparative Examples 4-3 to 4-4

Test secondary batteries were fabricated in the same manners as in Comparative Examples 3-1 to 3-2, except that 1% by weight of vinylene carbonate (VC) was added to the nonaqueous electrolytic solution.

[Evaluation of Battery]

(a) Battery blister amount after initial charge (b) Battery blister amount after high-temperature storage A change rate in battery thickness after each of initial charge and high-temperature storage was calculated in the same manner as in Example 1.

The test results are shown in the following Table 5.

TABLE 5

| | | Heteropolyacid compound | | Moisture | Acid | Change rate in battery | Change rate in battery |
|---|---|---|---|---|---|---|---|
| | Composition of electrolytic solution | Kind | Mixing amount [% by weight] | content [ppm] | content [ppm] | thickness after initial charge [%] | thickness after high-temperature storage [%] |
| Example 4-1 | EC + DEC | Compound I | 0.01 | 12 | 58 | 11.2 | 20.2 |
| Example 4-2 | LiPF$_6$ | | 0.05 | 12 | 58 | 11.1 | 18.0 |
| Example 4-3 | (0.8 moles/kg) | | 0.1 | 12 | 58 | 11.2 | 14.3 |
| Example 4-4 | | | 0.5 | 14 | 62 | 10.8 | 12.9 |
| Example 4-5 | | | 1.0 | 15 | 65 | 10.5 | 9.7 |
| Example 4-6 | | | 2.0 | 20 | 74 | 10.6 | 6.4 |
| Example 4-7 | | | 3.0 | 24 | 78 | 11.0 | 6.4 |
| Example 4-8 | | | 5.0 | 32 | 81 | 11.6 | 6.5 |
| Example 4-9 | | Compound J | 0.01 | 12 | 58 | 11.2 | 20.8 |
| Example 4-10 | | | 0.05 | 12 | 58 | 11.1 | 18.6 |
| Example 4-11 | | | 0.1 | 12 | 58 | 11.2 | 15.2 |
| Example 4-12 | | | 0.5 | 13 | 60 | 10.8 | 14.2 |
| Example 4-13 | | | 1.0 | 15 | 62 | 10.7 | 11.4 |
| Example 4-14 | | | 2.0 | 18 | 70 | 10.8 | 8.5 |
| Example 4-15 | | | 3.0 | 21 | 71 | 10.8 | 6.8 |
| Example 4-16 | | | 5.0 | 27 | 73 | 11.0 | 6.6 |
| Example 4-17 | EC + DEC + FEC | Compound I | 1.0 | 14 | 68 | 0.91 | 9.9 |
| Example 4-18 | LiPF$_6$ (0.8 moles/kg) | Compound J | | 13 | 62 | 0.93 | 11.3 |
| Example 4-19 | EC + DEC + VC | Compound I | | 13 | 64 | 0.94 | 9.9 |
| Example 4-20 | LiPF$_6$ (0.8 moles/kg) | Compound J | | 13 | 61 | 0.96 | 10.6 |
| Comparative Example 4-1 | EC + DEC + FEC LiPF$_6$ | Compound K | 1.0 | 478 | 2022 | 14.5 | 22.7 |
| Comparative Example 4-2 | (0.8 moles/kg) | Compound L | | 501 | 2145 | 16.1 | 25.9 |
| Comparative Example 4-3 | EC + DEC + VC LiPF$_6$ | Compound K | | 472 | 1994 | 15.0 | 23.2 |
| Comparative Example 4-4 | (0.8 moles/kg) | Compound L | | 528 | 2137 | 17.7 | 27.1 |

As is clear from Table 5, in the heteropolyacid compounds according to Compound I and Compound J, the battery blister-suppressing effect could be obtained over a wide addition amount range. Also, the potassium salt of a heteropolyacid is preferable as the heteropolyacid compound. In the potassium salt, since the content of the polyanion is relatively lowered, it is slightly inferior in the battery blister-suppressing effect to the lithium salt; however, it has a high effect for suppressing the increase of each of the moisture content and the acid content.

Also, in the case of using the heteropolyacid compounds according to Compound I and Compound J, by jointly using the reactive cyclic carbonate in the nonaqueous electrolytic solution, the battery blister-suppressing effect at the time of initial charge can be more enhanced.

On the other hand, in the respective Comparative Examples using a heteropolyacid, even by jointly using the reactive cyclic carbonate, the battery blister-suppressing effect was not sufficiently obtained.

7. Other Embodiments

In the foregoing embodiments and working examples, the batteries having a laminated film type or cylindrical type battery structure and the batteries having a rectangular battery structure have been described, but it should not be construed that the present invention is limited thereto. For example, the present invention can be applied to batteries having other battery structure such as a coin type and a button type and batteries having a laminate structure in which electrodes are laminated, and the same effects can be obtained. Also, with respect to the structure of the electrode body, not only a winding type but various configurations such as a laminated type and a zigzag type can be applied.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte comprising:
a solvent;
at least one heteropolyacid salt compound; and
an electrolyte salt other than the heteropolyacid salt compound,
wherein at least one of said heteropolyacid salt compounds is represented by the following formulae (I) and (II)

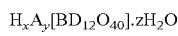  (I)

wherein
A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and x, y and z are values falling within the ranges of ($0 \leq x \leq 1$), ($2 \leq y \leq 4$) and ($0 \leq z \leq 5$), respectively, and

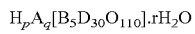  (II)

wherein
A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and p, q and r are values falling within the ranges of ($0 \leq p \leq 5$), ($10 \leq q \leq 15$) and ($0 \leq r \leq 15$), respectively, and
wherein an amount of acid component in the nonaqueous electrolyte solution is not more than 100 ppm.

2. The nonaqueous electrolyte according to claim 1, containing 0.01% by weight or more and not more than 3% by weight of the heteropolyacid salt compound.

3. The nonaqueous electrolyte according to claim 1, containing at least one member selected from cyclic carbonates represented by the following formula (III) or (IV)
wherein

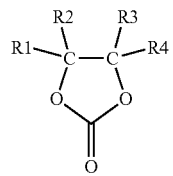  (III)

each of R1 to R4 represents a hydrogen group, a halogen group, an alkyl group or a halogenated alkyl group, provided with at least one of R1 to R4 represents a halogen group or a halogenated alkyl group, and

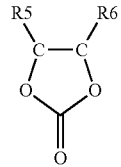  (IV)

wherein
each of R5 and R6 represents a hydrogen group or an alkyl group.

4. The nonaqueous electrolyte according to claim 1, wherein
the electrolyte salt contains at least one member selected from the group consisting of lithium hexafluorophosphate ($LiPF_6$), lithium tetrafluoroborate ($LiBF_4$), lithium perchlorate ($LiClO_4$) and lithium hexafluoroarsenate ($LiAsF_6$).

5. The nonaqueous electrolyte according to claim 1, wherein a content of the heteropolyacid salt compound in the nonaqueous electrolytic solution ranges from 0.01% to 3% by weight.

6. The nonaqueous electrolyte according to claim 1, wherein the electrolyte salt is a lithium fluoride salt.

7. The nonaqueous electrolyte according to claim 1, wherein am amount of moisture in the nonaqueous electrolyte solution is not more than 50 ppm.

8. A nonaqueous electrolyte battery comprising:
a positive electrode;
a negative electrode; and
a nonaqueous electrolyte including
at least one heteropolyacid salt compound, and
an electrolyte salt other than the heteropolyacid salt compound,
wherein a coating in a gel form containing an amorphous polyacid and/or polyacid compound containing one or more of a polyelement is provided on the surface of at least a part of the negative electrode,
wherein said polyelement is derived from at least one of the heteropolyacid salt compounds represented by the following formulae (I) and (II)

$$H_xA_y[BD_{12}O_{40}] \cdot zH_2O \quad (I)$$

wherein
A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and x, y and z are values falling within the ranges of ($0 \leq x \leq 1$), ($2 \leq y \leq 4$) and ($0 \leq z \leq 5$), respectively, and $$H_pA_q[B_5D_{30}O_{110}] \cdot rH_2O \quad (II)$$

wherein
A represents lithium (Li), sodium (Na), potassium (K), rubidium (Rb), cesium (Cs), magnesium (Mg), calcium (Ca), aluminum (Al), ammonium ($NH_4$), an ammonium salt or a phosphonium salt; B represents phosphorus (P), silicon (Si), arsenic (As) or germanium (Ge); D represents at least one element selected from the group consisting of titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re) and thallium (Tl); and p, q and r are values falling within the ranges of ($0 \leq p \leq 5$), ($10 \leq q \leq 15$) and ($0 \leq r \leq 15$), respectively, and
wherein an amount of acid component in the nonaqueous electrolyte solution is not more than 100 ppm.

9. The nonaqueous electrolyte battery according to claim 8, packaged by a package member composed of a laminated film.

10. The nonaqueous electrolyte battery according to claim 9, wherein
a change rate in battery thickness after initial charge at the time initial charge at a full charge voltage of 4.2 V is not more than 15%.

11. The nonaqueous electrolyte battery according to claim 9, wherein
a change rate in battery thickness after storage for 12 hours in an environment at 85° C. in a fully charged state is not more than 15%.

12. The nonaqueous electrolyte battery according to claim 8, wherein a content of the heteropolyacid salt compound in the nonaqueous electrolytic solution ranges from 0.01% to 3% by weight.

13. The nonaqueous electrolyte battery according to claim 8, wherein the electrolyte salt is a lithium fluoride salt.

14. The nonaqueous electrolyte battery according to claim 8, wherein am amount of moisture in the nonaqueous electrolyte solution is not more than 50 ppm.

* * * * *